(12) United States Patent
Futamura

(10) Patent No.: US 8,140,231 B2
(45) Date of Patent: Mar. 20, 2012

(54) ABNORMAL-PERIOD AUTOMATIC SHIFT CONTROL APPARATUS OF AUTOMATED MANUAL TRANSMISSION

(75) Inventor: Makoto Futamura, Ayase (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 687 days.

(21) Appl. No.: 12/254,376

(22) Filed: Oct. 20, 2008

(65) Prior Publication Data
US 2009/0138162 A1 May 28, 2009

(30) Foreign Application Priority Data

Nov. 22, 2007 (JP) .................................. 2007-302400
Jul. 15, 2008 (JP) .................................. 2008-183823

(51) Int. Cl.
*G06F 19/00* (2011.01)

(52) U.S. Cl. ........... 701/55; 477/154; 477/155; 477/158
(58) Field of Classification Search ............... 180/65.31, 180/65.26; 701/51, 55; 74/731.1; 477/154, 477/155, 158, 83; 903/902
See application file for complete search history.

(56) References Cited

U.S. PATENT DOCUMENTS
5,598,334 A * 1/1997 Shin et al. ........................ 701/51

FOREIGN PATENT DOCUMENTS
| EP | 1 750 040 A1 | 2/2007 |
| JP | 61-184135 A | 8/1986 |
| JP | 62-122825 A | 6/1987 |
| JP | 2007-040408 A | 2/2007 |

\* cited by examiner

*Primary Examiner* — Behrang Badii
(74) *Attorney, Agent, or Firm* — Foley & Lardner LLP

(57) ABSTRACT

In an abnormal-period automatic shift control apparatus of an automated manual transmission (AMT), a controller includes a first state detecting section configured to detect whether the AMT is in a first state where the AMT is thrown into a shift stage during an engine starting period, and a second state detecting section configured to detect whether the AMT is in a second state where a clutch failure that an automatic clutch, employed in the AMT for engine power transmission, remains engaged undesirably, occurs. Also provided is a neutral-range-period abnormality countermeasure section configured to inhibit a supply of working oil from an engine-drive oil pump, serving as a working medium for automatic-clutch engagement-and-disengagement control and automatic gear shifting, for preventing an automotive vehicle from beginning to move, while a selected operating range is a neutral range, under a condition where the first and second states occur simultaneously.

12 Claims, 4 Drawing Sheets

ABNORMAL-PERIOD AUTOMATIC SHIFT CONTROL APPARATUS OF AUTOMATED MANUAL TRANSMISSION

TECHNICAL FIELD

The present invention relates to an automated manual transmission in which rotation of an engine is inputted through an automatic clutch, a desired shift stage is realized by automatic-clutch engagement/disengagement control and gear shifting for a changeover in a transmission gear train, using working oil from an engine-drive pump as a working medium, and the input rotation from the engine is speed-changed based on the realized shift stage, and then the speed-changed rotation is outputted, and specifically to abnormal-period automatic shift control executed under an abnormal state where the automatic clutch remains engaged undesirably.

BACKGROUND ART

In recent years, there have been proposed and developed various automated manual transmissions, each of which employs a mechanism by which gear shifting is automated instead of manual gear shifting action (manual clutch operation) by the driver. One such automated manual transmission has been disclosed in Japanese Patent Provisional Publication No. 2007-040408 (hereinafter is referred to as "JP2007-040408"), assigned to the assignee of the present invention. In the case of an automated manual transmission, often abbreviated to "AMT", disclosed in JP2007-040408, due to the occurrence of an AMT system failure that an automatic clutch remains engaged undesirably, there is a risk of stalling an engine under an abnormal state where the AMT is unable to shift into neutral.

In such an abnormal state (i.e., with the automatic clutch remaining engaged), during the next engine starting period, the engine would be started up in a state where the AMT remains thrown into a certain shift stage (a certain range gear position). This state will be hereinafter referred to as "starting-period shift-stage thrown state". Thus, the AMT as disclosed in JP2007-040408 suffers from the following drawbacks.

Suppose that the previously-discussed AMT system failure that an automatic clutch remains engaged undesirably does not occur. Under such a normal state (i.e., in the absence of the AMT system failure), even when starting up the engine in a state where the AMT remains thrown into a certain shift stage, the automatic clutch can be released by using working oil discharged from the engine-drive pump as a working medium after the engine start-up, and additionally gear shifting can be made in a direction that the AMT is thrown out of the "starting-period shift-stage thrown state", in other words, the "starting-period shift-stage thrown state" is canceled. In such a case, there is no possibility that the automotive vehicle begins to move against the driver's intention, simultaneously with the engine start-up.

In contrast, suppose that the previously-discussed AMT system failure that an automatic clutch remains engaged undesirably, has occurred. Under such an abnormal state (i.e., in the presence of the AMT system failure), the release of the automatic clutch, which uses working oil discharged from the engine-drive pump as a working medium, cannot be made, and thus the automatic clutch remains kept at its engaged state. Therefore, even if the previously-discussed gear shifting is made in a direction that the "starting-period shift-stage thrown state" is canceled, there is a possibility that the vehicle begins to move against the driver's intention during a time period (e.g., for a brief moment during the engine starting period) from the time when the gear shifting has terminated to the time when the AMT has been shifted to neutral. Such an abnormal situation where the vehicle begins to move against the driver's intention during the engine starting period, means a state where, even when the driver has no intention of moving the vehicle and thus the driver-selected operating range of the AMT is neutral (the N range), the vehicle begins to move against the driver's intention. The abnormal situation also means a state where, even when the driver has an intention of forward-traveling of the vehicle and thus the driver-selected operating range of the AMT is drive (the D range), the vehicle begins to move backward (i.e., in the reverse direction opposite to the direction based on the driver's intention). The abnormal situation also means a state where, even when the driver has an intention of reverse-traveling of the vehicle and thus the driver-selected operating range of the AMT is reverse (the R range), the vehicle begins to go ahead (i.e., in the forward direction opposite to the direction based on the driver's intention).

A vehicle control technology, which is useful in avoiding the previously-noted abnormal situation, has been proposed and disclosed in Japanese Patent Provisional Publication No. 62-122825 (hereinafter is referred to as "JP62-122825"). According to the technology disclosed in JP62-122825, prior to the engine start-up, a transmission is automatically shifted to neutral (exactly, a neutral range position) that disables the transmission to transmit power with all gears disengaged, or an automatic clutch is automatically released. In the case of the vehicle control device disclosed in JP62-122825, the former countermeasure is taken against a clutch system failure that the automatic clutch remains engaged undesirably. Concretely, in the presence of the clutch system failure that the automatic clutch remains engaged undesirably, prior to the engine start-up, (exactly, prior to engine cranking), the transmission is automatically shifted to neutral (the N range).

SUMMARY OF THE INVENTION

In the case of an automated manual transmission (AMT) system configuration as discussed previously, in which a desired shift stage is realized by automatic-clutch engagement/disengagement control and gear shifting for a changeover in a transmission gear train, using working oil from an engine-drive pump as a working medium, however, prior to the engine start-up, there is no discharge of working oil from the engine-drive pump. Thus, it is impossible to automatically shift the AMT to neutral (the N range) by working oil. That is, it is impossible to actually take the previously-discussed countermeasure against a clutch system failure that the automatic clutch remains engaged undesirably. Such an automatic clutch system failure will be hereinafter referred to as "undesirably-kept-engaged automatic clutch failure". To realize the previously-discussed countermeasure, a motor-driven oil pump, which enables working-oil supply prior to the engine start-up, must be installed on the vehicle separately from the engine-drive pump. However, this leads to the problem of higher system installation time and costs and larger space requirements of overall system.

In order to prevent the vehicle from moving against the driver's intention when starting up the engine in the presence of the previously-discussed "undesirably-kept-engaged automatic clutch failure" and when the AMT is in the "starting-period shift-stage thrown state", a countermeasure that disables engine starting operation itself may be taken. By disabling the engine starting operation, it is possible to prevent or avoid the automotive vehicle from beginning to move against the driver's intention, simultaneously with the engine start-up. However, according to such a countermeasure that disables the engine starting operation itself, it is impossible to restart the engine after an engine stall has occurred in the presence of the previously-discussed "undesirably-kept-engaged automatic clutch failure" and when the AMT is in the "starting-period shift-stage thrown state". That is, once this countermeasure has been taken, it is impossible to restart the engine, thus disabling the vehicle to move. The countermeasure that disables the engine starting operation lacks convenience.

It is, therefore, in view of the previously-described disadvantages of the prior art, an object of the invention to provide an abnormal-period automatic shift control apparatus of an automated manual transmission of an automotive vehicle, which is configured to enable an engine start-up even in the presence of an "undesirably-kept-engaged automatic clutch failure" and when the automated manual transmission is in a "starting-period shift-stage thrown state", and also configured to be able to take a countermeasure that prevents the vehicle from beginning to move against the driver's intention simultaneously with the engine start-up, thereby avoiding both a lack of convenience and an abnormal situation where the vehicle begins to move against the driver's intention during the engine starting period.

In order to accomplish the aforementioned and other objects of the present invention, an abnormal-period automatic shift control apparatus of an automated manual transmission, comprises a controller comprising a first state detecting section configured to detect whether the automated manual transmission is in a first state where the automated manual transmission is thrown into a shift stage during an engine starting period, a second state detecting section configured to detect whether the automated manual transmission is in a second state where a clutch failure that an automatic clutch, employed in the automated manual transmission for engine power transmission, remains engaged undesirably, occurs, and a neutral-range-period abnormality countermeasure section configured to inhibit a supply of working oil from an engine-drive oil pump, serving as a working medium for automatic-clutch engagement-and-disengagement control and automatic gear shifting, for preventing an automotive vehicle from beginning to move, while a selected operating range is a neutral range, under a condition where the first and second states occur simultaneously.

According to another aspect of the invention, an abnormal-period automatic shift control apparatus of an automated manual transmission of an automotive vehicle in which rotation of an engine is inputted through an automatic clutch, a desired shift stage is realized by automatic-clutch engagement-and-disengagement control and automatic gear shifting for a changeover in a transmission gear train, using working oil from an engine-drive pump as a working medium, and the input rotation from the engine is speed-changed based on the realized shift stage, and then the speed-changed rotation is outputted, comprises a controller comprising a starting-period shift-stage thrown state detecting section configured to detect whether the automated manual transmission is in a starting-period shift-stage thrown state where the automated manual transmission is thrown into a shift stage during a starting period of the engine, an undesirably-kept-engaged automatic clutch failure detecting section configured to detect whether a clutch failure that the automatic clutch remains engaged undesirably, occurs, and a neutral-range-period abnormality countermeasure section configured to inhibit a supply of the working oil used for automatic-clutch engagement-and-disengagement control and automatic gear shifting, for preventing the vehicle from beginning to move, while a selected operating range is a neutral range at which power transmission through the automated manual transmission is disabled and rotation of a transmission output shaft is not mechanically restricted, under a condition where the automated manual transmission is in the starting-period shift-stage thrown state during the starting period of the engine and the clutch failure that the automatic clutch remains engaged undesirably, occurs.

The other objects and features of this invention will become understood from the following description with reference to the accompanying drawings.

DESCRIPTION OF THE PREFERRED EMBODIMENTS

Figure 1:
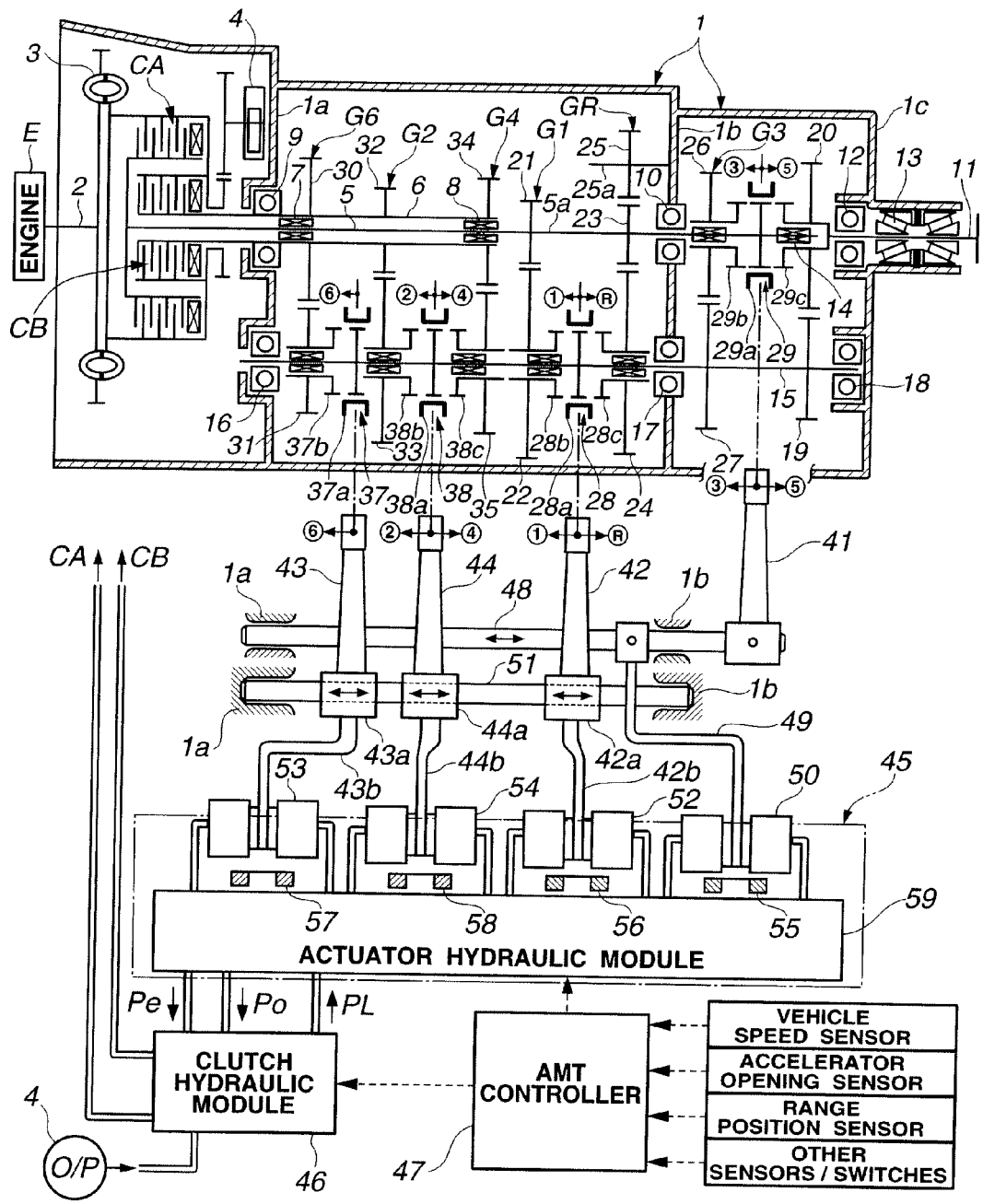
FIG. 1 is a system block diagram illustrating an embodiment of a twin-clutch automated manual transmission employing an abnormal-period automatic shift control system.

Referring now to the drawings, particularly to FIG. 1, the abnormal-period automatic shift control apparatus of the embodiment is exemplified in a so-called twin-clutch automated manual transmission (AMT) employing a transmission gear train that provides six forward speeds and reverse. In more detail, the AMT of the embodiment is configured to employ the following transmission gear train accommodated in a transmission case 1.

A torsion damper 3 is installed in the front end (the left-hand side in FIG. 1) of transmission case 1, for transmitting rotation inputted from an output shaft 2 (i.e., a crankshaft) of an engine E to two clutches, namely, the first clutch CA associated with odd shift stages (i.e., a first-speed gear, a third-speed gear, a fifth-speed gear, and a reverse-speed gear) and the second clutch CB associated with even shift stages (i.e., a second-speed gear, a fourth-speed gear, and a sixth-speed gear) with cushioning and torsional-vibration reducing effects Each of first clutch CA, associated with the odd shift stages (1st, 3rd, 5th, and reverse gears), and second clutch CB, associated with the even shift stages (2nd, 4th, and 6th gears), is constructed by an automatic wet rotary clutch.

An oil pump 4 is also provided in the front end (the left-hand side in FIG. 1) of transmission case 1, for discharging working oil as a working medium for automatic shift control of the twin-clutch automated manual transmission. Oil pump 4 is connected to engine crankshaft 2 via torsion damper 3. In other words, oil pump 4 has a driven connection with engine E. Thus, during operation of engine E, oil pump 4 is always driven by engine E, for discharging working oil as a working medium used for automatic clutch engagement/disengagement control of first and second clutches CA-CB and gear shifting for a changeover in the transmission gear train.

Also provided in transmission case 1 are two input shafts, namely, (i) the comparatively long, first input shaft 5 associated with the odd shift stages (1st, 3rd, 5th, and reverse gears) and extending from the front end of transmission case 1 to the rear end, and (ii) the comparatively short, cylindrical-hollow second input shaft 6 associated with the even shift stages (2nd, 4th, and 6th gears) and extending from the front end of transmission case 1 substantially to the midpoint.

Second input shaft 6 has a cylindrical-hollow structure into which first input shaft 5 is inserted. A front needle bearing 7 and a rear needle bearing 8 are interleaved between the outer periphery of first input shaft 5 and the inner periphery of the cylindrical-hollow second input shaft 6, to enable relative rotation between first and second input shafts 5-6, while maintaining concentric layout of first and second input shafts 5-6.

The front ends of first and second input shafts 5-6 are connected to respective driven sides of first and second clutches CA-CB. On the other hand, the drive sides of first and second clutches CA-CB are both connected via torsion damper 3 to engine crankshaft 2.

With the previously-discussed arrangement, when first clutch CA is engaged, first clutch CA permits rotation of engine E to be inputted via torsion damper 3 to first input shaft 5. In a similar manner, when second clutch CB is engaged, second clutch CB permits rotation of engine E to be inputted via torsion damper 3 to second input shaft 6.

Second input shaft 6 is rotatably supported on the front partition wall 1a of transmission case 1 by means of a ball bearing 9.

First input shaft 5 is configured to further protrude from the rear end of second input shaft 6. The protruded rear end portion 5a of first input shaft 5 is configured to penetrate the intermediate partition wall 1b of transmission case 1. The protruded rear end portion 5a is rotatably supported on the intermediate partition wall 1b by means of a ball bearing 10.

A transmission output shaft 11 is coaxially aligned with the rear end portion 5a of first input shaft 5. Transmission output shaft 11 is rotatably supported on the rear-end wall 1c of transmission case 1 by means of a bearing 12 (e.g., a taper roller bearing) and an axial bearing 13. Transmission output shaft 11 is also rotatably supported on the rear end portion 5a of first input shaft 5 by means of a needle bearing 14.

Although it is not clearly shown in FIG. 1, transmission output shaft 11 is connected via a propeller shaft (not shown) and a differential gear (not shown) and left and right axle-shafts (not shown) to left and right drive road wheels (not shown), in order to transmit the speed-changed rotation from transmission output shaft 11 of the AMT to the drive road wheels to realize the vehicle moving.

A countershaft 15 is arranged parallel to each of first and second input shafts 5-6 and transmission output shaft 11. Countershaft 15 is rotatably supported by the front partition wall 1a, intermediate partition wall 1b, and rear-end wall 1c of transmission case 1 via three roller bearings 16, 17, and 18.

A countergear 19 is integrally rigidly connected to the rear end of countershaft 15, whereas a transmission output gear 20 is installed on transmission output shaft 11. With countergear 19 and output gear 20 kept in meshed-engagement with each other, countershaft 15 and transmission output shaft 11 are drivingly connected to each other to transmit rotation from countershaft 15 to transmission output shaft 11 with speed reduction.

Also provided between countershaft 15 and the rear end portion 5a of first input shaft 5 are a plurality of gear sets, which belong to a group of odd shift stages (1st, 3rd, 5th, and reverse gears), namely, a first-speed gearset G1, a reverse-speed gearset GR, and a third-speed gearset G3. As seen in FIG. 1, first-speed gearset G1, reverse-speed gearset GR, and third-speed gearset G3 are laid out in that order, from the forward side of first-input-shaft rear end portion 5a to the backward side.

First-speed gearset G1 is constructed by a first-speed input gear 21 and a first-speed output gear 22 in meshed-engagement with each other. First-speed input gear 21 is fixedly connected to first-input-shaft rear end portion 5a, whereas first-speed output gear 22 is installed on countershaft 15.

Reverse-speed gearset GR is constructed by a reverse-speed input gear 23, a reverse-speed output gear 24, and a reverse-speed idler gear 25. Reverse-speed input gear 23 is fixedly connected to first-input-shaft rear end portion 5a. Reverse-speed output gear 24 is installed on countershaft 15. Reverse-speed idler gear 25 is in meshed-engagement with both reverse-speed input gear 23 and reverse-speed output gear 24. Reverse-speed idler gear 25 is rotatably supported on a reverse idler shaft 25a, which is protruded axially from the intermediate partition wall 1b of transmission case 1 and arranged parallel to the axis of first-input-shaft rear end portion 5a.

Third-speed gearset G3 is constructed by a third-speed input gear 26 and a third-speed output gear 27 in meshed-engagement with each other. Third-speed input gear 26 is installed on first-input-shaft rear end portion 5a, whereas third-speed output gear 27 is fixedly connected to countershaft 15.

A first-reverse synchromesh device (simply, 1-R synchronizer) 28 is arranged between first-speed gearset G1 and reverse-speed gearset GR in the axial direction, and installed on countershaft 15. When a coupling sleeve 28a of 1-R synchronizer 28 is moved to the left from its neutral position shown in FIG. 1, and brought into meshed-engagement with a clutch gear 28b, first-speed output gear 22 is drivingly connected to countershaft 15, thus realizing a shift to first (1st speed). Conversely when coupling sleeve 28a of 1-R synchronizer 28 is moved to the right from its neutral position shown in FIG. 1, and brought into meshed-engagement with a clutch gear 28c, reverse-speed output gear 24 is drivingly connected to countershaft 15, thus realizing a shift to reverse.

A third-fifth synchromesh device (simply, 3-5 synchronizer) 29 is arranged between third-speed gearset G3 and output gear 20 in the axial direction, and installed on first-input-shaft rear end portion 5a. When a coupling sleeve 29a of 3-5 synchronizer 29 is moved to the left from its neutral position shown in FIG. 1, and brought into meshed-engagement with a clutch gear 29b, third-speed input gear 26 is drivingly connected to first input shaft 5, thus realizing a shift to third (3rd speed). Conversely when coupling sleeve 29a of 3-5 synchronizer 29 is moved to the right from its neutral position shown in FIG. 1, and brought into meshed-engagement with a clutch gear 29c, first input shaft 5 and output gear 20 are directly connected to each other, thus realizing a shift to fifth (5th speed).

Also provided between second input shaft 6 and countershaft 15 are a plurality of gear sets, which belong to a group of even shift stages (2nd, 4th, and 6th gears), namely, a sixth-speed gearset G6, a second-speed gearset G2, and a fourth-speed gearset G4. As seen in FIG. 1, sixth-speed gearset G6, second-speed gearset G2, and fourth-speed gearset G4 are laid out in that order, from the front side of second input shaft 6 to the rear side.

Sixth-speed gearset G6 is constructed by a sixth-speed input gear 30 and a sixth-speed output gear 31 in meshed-engagement with each other. Sixth-speed input gear 30 is installed on second input shaft 6, whereas sixth-speed output gear 31 is installed on countershaft 15.

Second-speed gearset G2 is constructed by a second-speed input gear 32 and a second-speed output gear 33 in meshed-engagement with each other. Second-speed input gear 32 is installed on second input shaft 6, whereas second-speed output gear 33 is installed on countershaft 15.

Fourth-speed gearset G4 is constructed by a fourth-speed input gear 34 and a fourth-speed output gear 35 in meshed-engagement with each other. Fourth-speed input gear 34 is installed on second input shaft 6, whereas fourth-speed output gear 35 is installed on countershaft 15.

A sixth-neutral synchromesh device (simply, 6-N synchronizer) 37 is arranged at the right-hand side of sixth-speed gearset G6 and installed on countershaft 15. When a coupling sleeve 37a of 6-N synchronizer 37 is moved to the left from its neutral position shown in FIG. 1, and brought into meshed-engagement with a clutch gear 37b, sixth-speed output gear 31 is drivingly connected to countershaft 15, thus realizing a shift to sixth (6th speed).

A second-fourth synchromesh device (simply, 2-4 synchronizer) 38 is arranged between second-speed gearset G2 and fourth-speed gearset G4 in the axial direction, and installed on countershaft 15. When a coupling sleeve 38a of 2-4 synchronizer 38 is moved to the left from its neutral position shown in FIG. 1, and brought into meshed-engagement with a clutch gear 38b, second-speed output gear 33 is drivingly connected to countershaft 15, thus realizing a shift to second (2nd speed). Conversely when coupling sleeve 38a of 2-4 synchronizer 38 is moved to the right from its neutral position shown in FIG. 1, and brought into meshed-engagement with a clutch gear 38c, fourth-speed output gear 35 is drivingly connected to countershaft 15, thus realizing a shift to fourth (4th speed).

The details of the shift control system of the twin-clutch automated manual transmission (AMT), concretely, the details of control systems that manage automatic clutch engagement/disengagement control of first and second clutches CA-CB and gear shifting of each of synchronizers 28, 29, 37, and 38, are hereunder described.

The control system, which manages gear shifting of each of synchronizers 28, 29, 37, and 38, includes a 3-5 shift fork 41, a 1-R shift fork 42, a 6-N shift fork 43, a 2-4 shift fork 44, and an actuator unit 45. 3-5 shift fork 41 is fitted into an annular shift-fork groove in the outer periphery of coupling sleeve 29a for gear shifting made through 3-5 synchronizer 29. 1-R shift fork 42 is fitted into an annular shift-fork groove in the outer periphery of coupling sleeve 28a for gear shifting made through 1-R synchronizer 28. 6-N shift fork 43 is fitted into an annular shift-fork groove in the outer periphery of coupling sleeve 37a for gear shifting made through 6-N synchronizer 37. 2-4 shift fork 44 is fitted into an annular shift-fork groove in the outer periphery of coupling sleeve 38a for gear shifting made through 2-4 synchronizer 38. Actuator unit 45 is provided to create a stroke of each of shift forks 41-44, needed for gear shifting.

The control system, which manages automatic clutch engagement/disengagement control of each of first and second clutches CA-CB, includes a clutch hydraulic module 46. The engagement/disengagement of first clutch CA and the engagement/disengagement of second clutch CB are controlled in response to respective clutch control pressures generated from clutch hydraulic module 46. The operations of clutch hydraulic module 46 and actuator unit 45 are controlled by a common automated manual transmission (AMT) controller 47 (described later).

3-5 shift fork 41 is fixedly connected to a first shift rod 48, such that gear shifting is made through 3-5 synchronizer 29 with a stroke of first shift rod 48 (a sliding movement of first shift rod 48 in its longitudinal direction). For this reason, both ends of first shift rod 48 are axially slidably supported by both the front partition wall 1a and the intermediate partition wall 1b of transmission case 1. Also, a 3-5 shift bracket 49 is fixedly connected at one end to first shift rod 48. The other end of 3-5 shift bracket 49 is loosely fitted into a grooved, spool connecting-shaft portion of a 3-5 shift actuator 50. Therefore, 3-5 shift fork 41 can be moved from its neutral position shown in FIG. 1 leftward (for realizing a shift to third) or rightward (for realizing a shift to fifth), in accordance with a sliding movement of the spool of 3-5 shift actuator 50.

1-R shift fork 42 is mounted on a second shift rod 51 arranged parallel to first shift rod 48, such that a sliding movement of 1-R shift fork 42 relative to second shift rod 51 is permitted. Both ends of second shift rod 51 are fixedly connected to the front partition wall 1a and the intermediate partition wall 1b of transmission case 1. 1-R shift fork 42 is formed integral with a 1-R shift bracket cylindrical-hollow portion 42a and a 1-R shift bracket link portion 42b. 1-R shift bracket cylindrical-hollow portion 42a is slidably fitted onto second shift rod 51. One end of 1-R shift bracket link portion 42b is fixed to the outer periphery of 1-R shift bracket cylindrical-hollow portion 42a, whereas the other end of 1-R shift bracket link portion 42b is loosely fitted into a grooved, spool connecting-shaft portion of a 1-R shift actuator 52. Therefore, 1-R shift fork 42 can be moved from its neutral position shown in FIG. 1 leftward (for realizing a shift to first) or rightward (for realizing a shift to reverse), in accordance with a sliding movement of the spool of 1-R shift actuator 52.

6-N shift fork 43 is mounted on second shift rod 51 whose both ends are fixedly connected to the front partition wall 1a and the intermediate partition wall 1b of transmission case 1, such that a sliding movement of 6-N shift fork 43 relative to second shift rod 51 is permitted. 6-N shift fork 43 is formed integral with a 6-N shift bracket cylindrical-hollow portion 43a and a 6-N shift bracket link portion 43b. 6-N shift bracket cylindrical-hollow portion 43a is slidably fitted onto second shift rod 51. One end of 6-N shift bracket link portion 43b is fixed to the outer periphery of 6-N shift bracket cylindrical-hollow portion 43a, whereas the other end of 6-N shift bracket link portion 43b is loosely fitted into a grooved, spool connecting-shaft portion of a 6-N shift actuator 53. Therefore, 6-N shift fork 43 can be moved from its neutral position shown in FIG. 1 leftward (for realizing a shift to sixth), in accordance with a sliding movement of the spool of 6-N shift actuator 53.

2-4 shift fork 44 is mounted on second shift rod 51 whose both ends are fixedly connected to the front partition wall 1a and the intermediate partition wall 1b of transmission case 1, such that a sliding movement of 2-4 shift fork 44 relative to second shift rod 51 is permitted. 2-4 shift fork 44 is formed integral with a 2-4 shift bracket cylindrical-hollow portion 44a and a 2-4 shift bracket link portion 44b. 2-4 shift bracket cylindrical-hollow portion 44a is slidably fitted onto second shift rod 51. One end of 2-4 shift bracket link portion 44b is fixed to the outer periphery of 2-4 shift bracket cylindrical-hollow portion 44a, whereas the other end of 2-4 shift bracket link portion 44b is loosely fitted into a grooved, spool connecting-shaft portion of a 2-4 shift actuator 54. Therefore, 2-4 shift fork 44 can be moved from its neutral position shown in FIG. 1 leftward (for realizing a shift to second) or rightward (for realizing a shift to fourth), in accordance with a sliding movement of the spool of 2-4 shift actuator 54.

Actuator unit 45 is mounted on transmission case 1, and comprised of 3-5 shift actuator 50, 1-R shift actuator 52, 6-N shift actuator 53, and 2-4 shift actuator 54, all formed integral with each other.

Actuator unit 45 is also provided with a 3-5 shift position sensor 55 for 3-5 shift actuator 50, a 1-R shift position sensor 56 for 1-R shift actuator 52, a 6-N shift position sensor 57 for 6-N shift actuator 53, a 2-4 shift position sensor 58 for 2-4 shift actuator 54, and an actuator hydraulic module 59.

Actuator hydraulic module 59 is configured to produce an even-shift-stage pressure Pe and an odd-shift-stage pressure Po, while using the regulated line pressure PL produced by clutch hydraulic module 46 as an initial pressure. Actuator hydraulic module 59 is also configured to supply an actuator working pressure to the shift pressure line related to the shift actuator corresponding to the shift stage to be realized.

Clutch hydraulic module 46 is configured to regulate a fluid pressure of working oil discharged from engine-drive oil pump 4 into a predetermined line pressure PL. Clutch hydraulic module 46 is also configured to create, based on even-shift-stage pressure Pe from actuator hydraulic module 59, a clutch control pressure to be supplied to second clutch CB, and to create, based on odd-shift-stage pressure Po from actuator hydraulic module 59, a clutch control pressure to be supplied to first clutch CA.

AMT controller 47 is configured to generate a shift-stage control command (needed for realizing a desired shift stage) to each solenoid of actuator hydraulic module 59. AMT controller 47 is also configured to generate a clutch-engagement control command (containing a line-pressure control command) to each solenoid of clutch hydraulic module 46.

For the reasons discussed above, the input interface circuitry of AMT controller 47 receives input information from various engine/vehicle sensors and switches, namely, a vehicle speed sensor, an accelerator opening sensor (an accelerator position sensor), a range position sensor, and other sensors (e.g., 3-5 shift position sensor 55, 1-R shift position sensor 56, 6-N shift position sensor 57, 2-4 shift position sensor 58, an even-shift-stage clutch pressure sensor 83 (described later), an odd-shift-stage clutch pressure sensor 84 (described later), and the like) and switches (e.g., an ignition switch, and the like). The vehicle speed sensor generates a signal indicative of vehicle speed. The accelerator opening sensor generates a signal indicative of an amount of depression of an accelerator pedal. The range position sensor generates a signal indicative of a driver-selected range (or a driver-intended range of the AMT), which is manually selected by the driver depending on the driving condition of the vehicle, for example, a parking range (P range), a reverse range (R range for reverse-traveling), a neutral range (N range for stopping), a drive range (D range for forward-traveling), and the like. AMT controller 47 generally comprises a microcomputer. AMT controller 47 includes an input/output interface (I/O), memories (RAM, ROM), and a microprocessor or a central processing unit (CPU). The input/output interface (I/O) of AMT controller 47 receives the previously-noted input information from the engine/vehicle sensors and switches. Within AMT controller 47, the central processing unit (CPU) allows the access by the I/O interface of input informational data signals from the previously-discussed engine/vehicle switches and sensors. The CPU of AMT controller 47 is responsible for carrying the predetermined control program stored in memories and is capable of performing necessary arithmetic and logic operations containing automatic clutch control management processing and gear shifting control management processing. Computational results (arithmetic calculation results), that is, calculated output signals (i.e., a shift-stage control command needed for realizing a desired shift stage and a clutch-engagement control command containing a line-pressure control command) are relayed through the output interface circuitry of AMT controller 47 to output stages, namely, the solenoids of actuator hydraulic module 59 and the solenoids of clutch hydraulic module 46.

Figure 2:
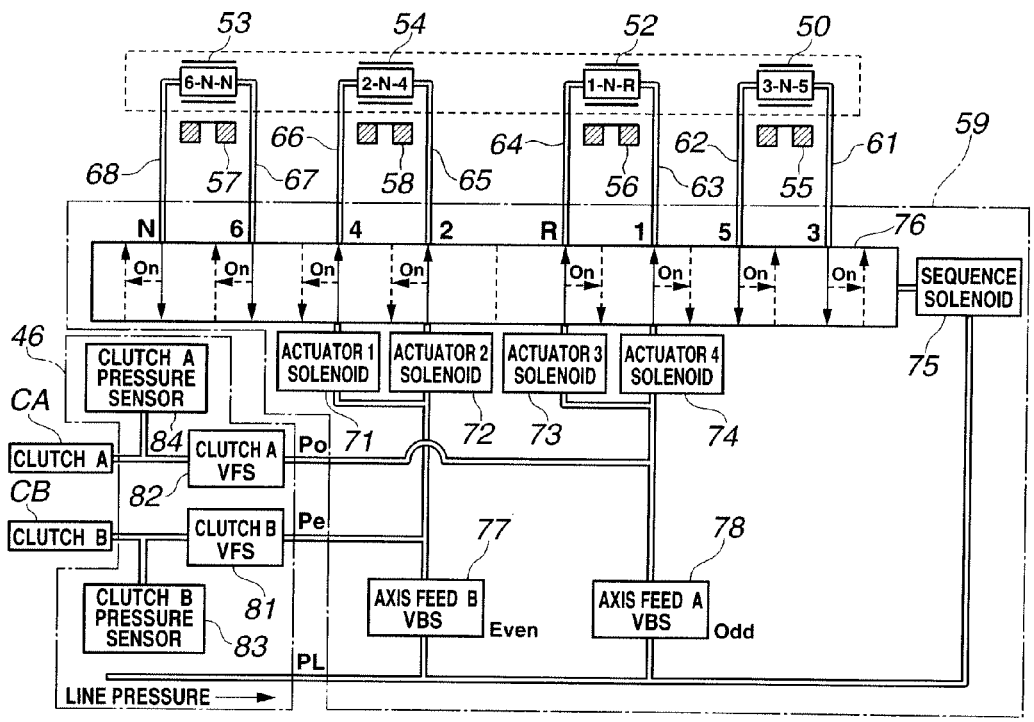
FIG. 2 is a hydraulic circuit diagram illustrating the working condition of the shift control system of the twin-clutch automated manual transmission of the embodiment, when a sequence solenoid, incorporated in the shift control system, is kept in its de-energized (OFF) state.
Figure 3:
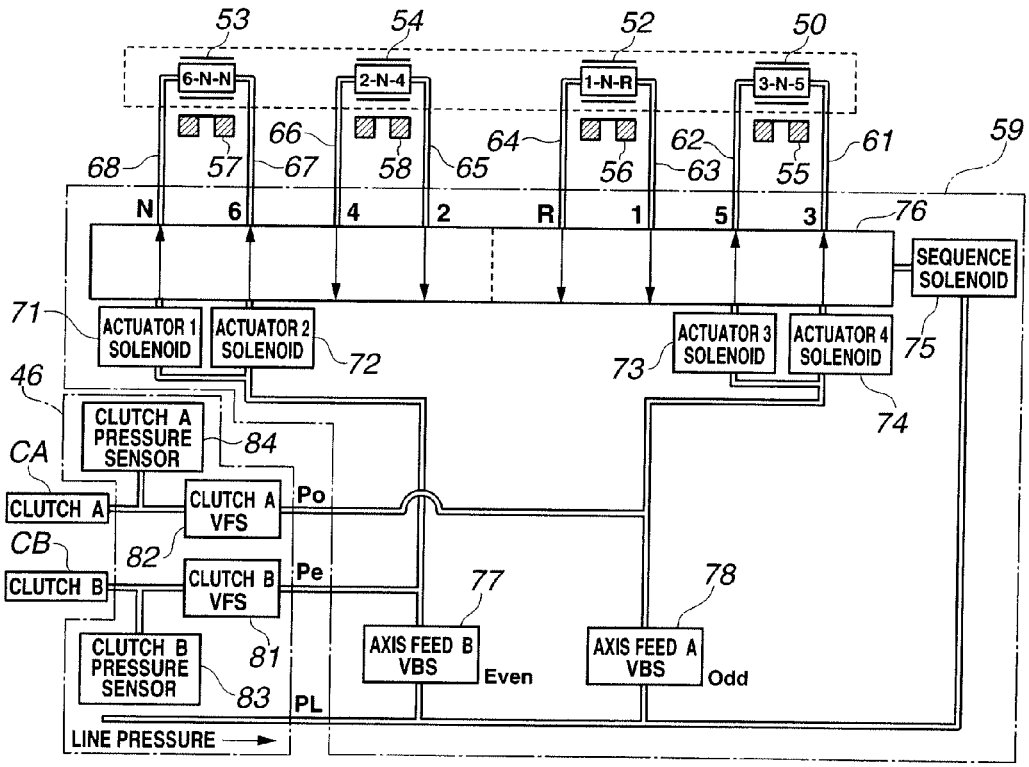
FIG. 3 is a hydraulic circuit diagram illustrating the working condition of the shift control system of the twin-clutch automated manual transmission of the embodiment, when the sequence solenoid is kept in its energized (ON) state.

Referring now to FIGS. 2-3, there are shown the detailed structures of actuator hydraulic module 59 and clutch hydraulic module 46. FIG. 2 is the hydraulic circuit diagram explaining the working condition of actuator hydraulic module 59 and clutch hydraulic module 46, when a sequence solenoid 75, incorporated in actuator hydraulic module 59, is kept in its de-energized (OFF) state. In contrast, FIG. 3 is the hydraulic circuit diagram explaining the working condition of actuator hydraulic module 59 and clutch hydraulic module 46, when sequence solenoid 75 is kept in its energized (ON) state.

As seen in FIGS. 2-3, actuator hydraulic module 59 has a dual fluid-line system for each of four shift actuators 50, 52, 53, and 54, concretely, eight fluid lines 61, 62, 63, 64, 65, 66, 67, and 68, in total. That is, actuator hydraulic module 59 is an actuator hydraulic circuit configured to modify or change the opening and closing states of eight fluid lines 61-68 by means of four actuator solenoids 71, 72, 73, and 74 and only one sequence solenoid 75.

Of these fluid lines 61-68, fluid line 61 corresponds to a third-speed pressure fluid line. Fluid line 62 corresponds to a fifth-speed pressure fluid line, fluid line 63 corresponds to a first-speed pressure fluid line, fluid line 64 corresponds to a reverse-speed pressure fluid line, fluid line 65 corresponds to a second-speed pressure fluid line, fluid line 66 corresponds to a fourth-speed pressure fluid line, fluid line 67 corresponds to a sixth-speed pressure fluid line, and fluid line 68 corresponds to a neutral pressure fluid line.

Of the four actuator solenoids 71-74, each of the first and second actuator solenoids 71-72 is comprised of an ON-OFF solenoid that determines the presence or absence of an output of even-shift-stage pressure Pe for a group of even shift stages (2nd, 4th, and 6th gears). On the other hand, each of the third and fourth actuator solenoids 73-74 is comprised of an ON-OFF solenoid that determines the presence or absence of an output of odd-shift-stage pressure Po for a group of odd shift stages (1st, 3rd, 5th, and reverse gears).

The single sequence solenoid 75 has a spool 76. With the sequence solenoid de-energized (OFF), spool 76 is kept at its initial spool position (i.e., the deactivated spool position) shown in FIG. 2. With spool 76 kept at the initial position (see FIG. 2), it is possible to realize low-speed gear stages containing the first-speed gear and the reverse-speed gear, more concretely, 1st-speed, 2nd-speed, 4th-speed, and reverse-speed gear stages.

Conversely with the sequence solenoid energized (ON), spool 76 is kept at its activated spool position shown in FIG. 3. With spool 76 kept at the activated position (see FIG. 3), it is possible to realize high-speed gear stages, namely, 3rd-speed, 5th-speed, and 6th-speed gear stages.

Actuator hydraulic module 59 further includes an even-shift-stage pressure solenoid 77 and an odd-shift-stage pressure solenoid 78. Even-shift-stage pressure solenoid 77 is configured to create even-shift-stage pressure Pe to be supplied to each of the first and second actuator solenoids 71-72. Odd-shift-stage pressure solenoid 78 is configured to create odd-shift-stage pressure Po to be supplied to each of the third and fourth actuator solenoids 73-74. In the shown embodiment, even-shift-stage pressure solenoid 77 is comprised of a continuously variable bleed solenoid valve (VBS), which is configured to continuously control or vary even-shift-stage pressure Pe. In a similar manner, odd-shift-stage pressure solenoid 78 is comprised of a continuously variable bleed solenoid valve (VBS), which is configured to continuously control or vary odd-shift-stage pressure Po.

Clutch hydraulic module 46 has a line-pressure solenoid (not shown) that regulates a fluid pressure of working oil discharged from engine-drive oil pump 4 into a predetermined line pressure PL. Clutch hydraulic module 46 has a clutch control pressure solenoid 81 configured to create, based on even-shift-stage pressure Pe from actuator hydraulic module 59, an even-shift-stage clutch control pressure to be supplied to second clutch CB. Also, clutch hydraulic module 46 has a clutch control pressure solenoid 82 configured to create, based on odd-shift-stage pressure Po from actuator hydraulic module 59, an odd-shift-stage clutch control pressure to be supplied to first clutch CA.

Furthermore, clutch hydraulic module 46 has an even-shift-stage clutch pressure sensor 83 that detects the even-shift-stage clutch control pressure supplied to second clutch CB, and an odd-shift-stage clutch pressure sensor 84 that detects the odd-shift-stage clutch control pressure supplied to first clutch CA. In the shown embodiment, clutch control pressure solenoid 81 is comprised of a continuously variable force solenoid valve (VFS), which is configured to continuously control or vary the even-shift-stage clutch control pressure. In a similar manner, clutch control pressure solenoid 82 is comprised of a continuously variable force solenoid valve (VFS), which is configured to continuously control or vary the odd-shift-stage clutch control pressure.

An automatic shift (automatic gear shifting) of the twin-clutch automated manual transmission of the embodiment is made by AMT controller 47 of FIG. 1, as follows.

[Automatic Gear Shifting]

When the driver selects neutral (N range) or parking (P range), the first and second clutches CA-CB are both released, because of no generation of each of even-shift-stage clutch control pressure and odd-shift-stage clutch control pressure. Additionally, 3-5 shift actuator 50, 1-R shift actuator 52, 6-N shift actuator 53, and 2-4 shift actuator 54 are all kept at their neutral positions shown in FIG. 1, with actuator solenoids 71-74 de-energized.

With shift actuators 50, 52, 53, and 54 kept at their neutral positions, coupling sleeve 28a of 1-R synchronizer 28, coupling sleeve 29a of 3-5 synchronizer 29, coupling sleeve 37a of 6-N synchronizer 37, and coupling sleeve 38a of 2-4 synchronizer 38 are all kept at their neutral positions shown in FIG. 1.

Accordingly, the twin-clutch AMT of the embodiment is kept in its neutral state that disables the AMT to transmit power.

Therefore, in the presence of the selection of either the N or P range, the twin-clutch AMT disables rotation of engine E to be transmitted to transmission output shaft 11 with two clutches CA-CB both released.

Additionally, in the presence of the selection of the P range, the AMT is conditioned in a state where rotation of transmission output shaft 11 is mechanically restricted by means of a park lock pawl. On the other hand, in the presence of the selection of the N range, the AMT is conditioned in a state where rotation of transmission output shaft 11 is not mechanically restricted, in the same manner as the selection of the traveling range (either the D or R range) at which power transmission through transmission output shaft 11 of the AMT to the drive road wheels is enabled. Each of the N and P ranges is the non-traveling range at which power transmission through transmission output shaft 11 of the AMT to the drive road wheels is disabled.

In the presence of the selection of either the traveling range (either the D or R range) or a manual mode (=a manual shifting mode by the driver), automatic shift control is made basically according to the following procedures.

(1st-Speed)

When realizing the first-speed gear position, sequence solenoid 75 is de-energized (OFF) and thus spool 76 is kept at its initial spool position (i.e., the deactivated spool position) shown in FIG. 2. On the other hand, actuator solenoid 74 is energized (ON) to supply odd-shift-stage pressure Po to 1-R shift actuator 52, and thus 1-R shift actuator 52 is moved to the left (viewing FIG. 1). Coupling sleeve 28a of 1-R synchronizer 28 is moved to the left from its neutral position shown in FIG. 1, and thus first-speed output gear 22 is drivingly connected to countershaft 15. Thereafter, first clutch CA is engaged by pressure-buildup control for the odd-shift-stage clutch control pressure created and regulated through clutch control pressure solenoid 82, using odd-shift-stage pressure Po as an initial pressure. As a result, first clutch CA permits rotation of engine E to be transmitted to first input shaft 5. Power flow from engine E through first input shaft 5, first-speed gearset G1, countershaft 15, and the output gearset (countergear 19 plus output gear 20) to transmission output shaft 11 is permitted. In this manner, it is possible to realize a state where the AMT has been thrown into the first-speed gear position.

(2nd-Speed)

When making a 1-2 upshift from first to second, under the state where the AMT has been thrown into the first-speed gear position, actuator solenoid 72 is energized (ON) to supply even-shift-stage pressure Pe to 2-4 shift actuator 54. Thus, 2-4 shift actuator 54 is moved to the left (viewing FIG. 1). Coupling sleeve 38a of 2-4 synchronizer 38 is moved to the left from its neutral position shown in FIG. 1, and thus second-speed output gear 33 is drivingly connected to countershaft 15. Thereafter, the odd-shift-stage clutch control pressure applied to first clutch CA is reduced by clutch control pressure solenoid 82 to release first clutch CA. At the same time, second clutch CB is engaged by pressure-buildup control for the even-shift-stage clutch control pressure created and regulated through clutch control pressure solenoid 81, using even-shift-stage pressure Pe as an initial pressure. That is to say, a changeover of the clutch engaged state from first clutch CA to second clutch CB (in other words, a changeover of the clutch disengaged state from second clutch CB to first clutch CA) occurs, and thus a 1-2 upshift is achieved. As a result, second clutch CB permits rotation of engine E to be transmitted to second input shaft 6. Power flow from engine E through second input shaft 6, second-speed gearset G2, countershaft 15, and the output gearset (countergear 19 plus output gear 20) to transmission output shaft 11 is permitted. In this manner, it is possible to realize a state where the AMT has been thrown into the second-speed gear position. Additionally, just after the previously-discussed 1-2 upshifting operation, actuator solenoid 73 is energized (ON) to supply odd-shift-stage pressure Po to 1-R shift actuator 52, thereby returning 1-R shift actuator 52 from the first-speed gear realization position (the position of 1-R shift actuator 52 just after a shift to first has been completed) to the neutral position shown in FIG. 1 and causing first-speed output gear 22 to be disconnected from countershaft 15.

(3rd-Speed)

When making a 2-3 upshift from second to third, sequence solenoid 75 is energized (ON) and thus spool 76 is kept at its activated spool position shown in FIG. 3. Actuator solenoid 74 is also energized (ON) to supply odd-shift-stage pressure Po to 3-5 shift actuator 50, and thus 3-5 shift actuator 50 is moved to the left (viewing FIG. 1). Coupling sleeve 29a of 3-5 synchronizer 29 is moved to the left from its neutral position shown in FIG. 1, and thus third-speed output gear 26 is drivingly connected to first input shaft 5. Thereafter, the even-shift-stage clutch control pressure applied to second clutch CB is reduced by clutch control pressure solenoid 81 to release second clutch CB. At the same time, first clutch CA is engaged by pressure-buildup control for the odd-shift-stage clutch control pressure created and regulated through clutch control pressure solenoid 82, using odd-shift-stage pressure Po as an initial pressure. That is to say, a changeover of the clutch engaged state from second clutch CB to first clutch CA (in other words, a changeover of the clutch disengaged state from first clutch CA to second clutch CB) occurs, and thus a 2-3 upshift is achieved. As a result, first clutch CA permits rotation of engine E to be transmitted to first input shaft 5. Power flow from engine E through first input shaft 5, third-speed gearset G3, countershaft 15, and the output gearset (countergear 19 plus output gear 20) to transmission output shaft 11 is permitted. In this manner, it is possible to realize a state where the AMT has been thrown into the third-speed gear position.

(4th-Speed)

When making a 3-4 upshift from third to fourth, sequence solenoid 75 is de-energized (OFF) and thus spool 76 is kept at its deactivated spool position shown in FIG. 2. Actuator solenoid 71 is energized (ON) to supply even-shift-stage pressure Pe to 2-4 shift actuator 54, and thus 2-4 shift actuator 54 is moved to the right (viewing FIG. 1). Coupling sleeve 38a of 2-4 synchronizer 38, whose internal teeth remain engaged with external teeth on clutch gear 38b of second-speed output gear 33 after the 1-2 upshift, is moved to the right (viewing FIG. 1), and thus fourth-speed output gear 35 is drivingly connected to countershaft 15. Thereafter, the odd-shift-stage clutch control pressure applied to first clutch CA is reduced by clutch control pressure solenoid 82 to release first clutch CA. At the same time, second clutch CB is engaged by pressure-buildup control for the even-shift-stage clutch control pressure regulated through clutch control pressure solenoid 81. That is to say, a changeover of the clutch engaged state from first clutch CA to second clutch CB (in other words, a changeover of the clutch disengaged state from second clutch CB to first clutch CA) occurs, and thus a 3-4 upshift is achieved. As a result, second clutch CB permits rotation of engine E to be transmitted to second input shaft 6. Power flow from engine E through second input shaft 6, fourth-speed gearset G4, countershaft 15, and the output gearset (countergear 19 plus output gear 20) to transmission output shaft 11 is permitted. In this manner, it is possible to realize a state where the AMT has been thrown into the fourth-speed gear position.

(5th-Speed)

When making a 4-5 upshift from fourth to fifth, sequence solenoid 75 is energized (ON) and thus spool 76 is kept at its activated spool position shown in FIG. 3. Actuator solenoid 73 is energized (ON) to supply odd-shift-stage pressure Po to 3-5 shift actuator 50, and thus 3-5 shift actuator 50 is moved to the right (viewing FIG. 1). Coupling sleeve 29a of 3-5 synchronizer 29, whose internal teeth remain engaged with external teeth on clutch gear 29b of third-speed input gear 26 after the 2-3 upshift, is moved to the right (viewing FIG. 1), and thus first input shaft 5 is connected directly to transmission output shaft 11. Thereafter, the even-shift-stage clutch control pressure applied to second clutch CB is reduced by clutch control pressure solenoid 81 to release second clutch CB. At the same time, first clutch CA is engaged by pressure-buildup control for the odd-shift-stage clutch control pressure regulated through clutch control pressure solenoid 82. That is to say, a changeover of the clutch engaged state from second clutch CB to first clutch CA (in other words, a changeover of the clutch disengaged state from first clutch CA to second clutch CB) occurs, and thus a 4-5 upshift is achieved. As a result, first clutch CA permits rotation of engine E to be transmitted to first input shaft 5. Power flow from engine E through first input shaft 5 and coupling sleeve 29a of 3-5 synchronizer 29 to transmission output shaft 11 is permitted. In this manner, it is possible to realize a state where the AMT has been thrown into the fifth-speed gear position at which a transmission ratio is "1".

(6th-Speed)

When making a 5-6 upshift from fifth to sixth, sequence solenoid 75 is energized (ON) and thus spool 76 is kept at its activated spool position shown in FIG. 3. Actuator solenoid 72 is energized (ON) to supply even-shift-stage pressure Pe to 6-N shift actuator 53, and thus 6-N shift actuator 53 is moved to the left from its neutral position shown in FIG. 1. Coupling sleeve 37a of 6-N synchronizer 37 is moved to the left from its neutral position shown in FIG. 1, and thus sixth-speed output gear 31 is drivingly connected to countershaft 15. Thereafter, the odd-shift-stage clutch control pressure applied to first clutch CA is reduced by clutch control pressure solenoid 82 to release first clutch CA. At the same time, second clutch CB is engaged by pressure-buildup control for the even-shift-stage clutch control pressure regulated through clutch control pressure solenoid 81. That is to say, a changeover of the clutch engaged state from first clutch CA to second clutch CB (in other words, a changeover of the clutch disengaged state from second clutch CB to first clutch CA) occurs, and thus a 5-6 upshift is achieved. As a result, second clutch CB permits rotation of engine E to be transmitted to second input shaft 6. Power flow from engine E through second input shaft 6, sixth-speed gearset G6, countershaft 15, and the output gearset (countergear 19 plus output gear 20) to transmission output shaft 11 is permitted. In this manner, it is possible to realize a state where the AMT has been thrown into the sixth-speed gear position. Additionally, just after the previously-discussed 5-6 upshifting operation, actuator solenoid 74 is energized (ON) to supply odd-shift-stage pressure Po to 3-5 shift actuator 50, thereby returning 3-5 shift actuator 50 from the fifth-speed gear realization position (the position of 3-5 shift actuator 50 just after a 4-5 upshift has been completed) to the neutral position shown in FIG. 1 and causing output gear 20 to be disconnected from rear end portion 5a of first input shaft 5.

The previously-discussed automatic shift control is exemplified in automatic upshifting from the first gear stage through the second, third, fourth, and fifth gear stages to the sixth gear stage, in that order. Automatic downshifting from the sixth gear stage through the fifth, fourth, third, and second gear stages to the first gear stage can be performed in accordance with automatic shift control procedures reverse to upshifting as previously discussed.

(Reverse-Speed Gear Stage)

When the driver has an intention of reverse-traveling of the vehicle with the AMT shifted to reverse (the R range), sequence solenoid 75 is de-energized (OFF) and thus spool 76 is kept at its deactivated spool position shown in FIG. 2. Actuator solenoid 73 is energized (ON) to supply odd-shift-stage pressure Po to 1-R shift actuator 52, and thus 1-R shift actuator 52 is moved to the right (viewing FIG. 1). Coupling sleeve 28a of 1-R synchronizer 28 is moved to the right from its neutral position shown in FIG. 1, and thus reverse-speed output gear 24 is drivingly connected to countershaft 15. Thereafter, first clutch CA is engaged by pressure-buildup control for the odd-shift-stage clutch control pressure created and regulated through clutch control pressure solenoid 82, using odd-shift-stage pressure Po as an initial pressure. As a result, first clutch CA permits rotation of engine E to be transmitted to first input shaft 5. Power flow from engine E through first input shaft 5, reverse-speed gearset GR, countershaft 15, and the output gearset (countergear 19 plus output gear 20) to transmission output shaft 11 is permitted. In this manner, it is possible to realize a state where the AMT has been thrown into the reverse-speed gear position.

[Control Action During Abnormal Period of Clutch]

For instance, suppose that a failure in clutch control pressure solenoid 82 related to first clutch CA or a failure in the clutch control system related to first clutch CA occurs, and thus the odd-shift-stage clutch control pressure supply to first clutch CA continues, and as a result first clutch CA remains engaged undesirably. In the shown embodiment, the abnormal state where the clutch control pressure supply to the clutch (either first clutch CA or second clutch CB) continues owing to a clutch control pressure solenoid failure or a clutch control system failure, and as a result the clutch remains engaged undesirably, is defined as or referred to as "undesirably-kept-engaged automatic clutch failure". The abnormal-period control action, performed by the shift control apparatus of the AMT of the embodiment in the presence of the "undesirably-kept-engaged automatic clutch failure", is hereunder explained in detail.

Suppose that, during vehicle traveling with the AMT shifted to a certain odd shift stage, a malfunction in first clutch CA, associated with odd shift stages, takes place due to a failure in the associated clutch control pressure solenoid or a failure in the associated clutch control system. In such a case, usually, there is a risk of stalling the engine, since the AMT is unable to shift into neutral (the N range) due to the "undesirably-kept-engaged automatic clutch failure".

In such an abnormal state, during the next engine starting period, the engine would be started up in a state where the AMT remains thrown into a certain odd shift stage. Hitherto, the conventional AMT suffers from the following drawbacks.

For instance, under a normal state, that is, in the absence of the "undesirably-kept-engaged automatic clutch failure", even when starting up the engine in a state where the AMT remains thrown into a certain odd shift stage, clutch control pressure solenoid 82 can be controlled not to supply odd-shift-stage pressure Po produced based on working oil (serving as a working medium) discharged from engine-drive oil pump 4 just after the engine start-up, as a clutch control pressure. That is, under the normal state, by means of clutch control pressure solenoid 82, associated with first clutch CA, the odd-shift-stage clutch control pressure can be kept zero, and thus first clutch CA can be continuously kept released. On the other hand, either one of actuator solenoids 73-74, is energized responsively to a control command signal from AMT controller 47, such that gear shifting is made in a direction that the AMT is thrown out of the "starting-period shift-stage thrown state", in other words, the "starting-period shift-stage thrown state" is canceled, by application of odd-shift-stage pressure Po supplied through the energized actuator solenoid (73 or 74) associated with the thrown odd shift stage. During the time period from the beginning of the previously-noted gear shifting for cancellation of the "starting-period shift-stage thrown state" to the completion of the gear shifting, under the normal state, first clutch CA is continuously kept released because of zero odd-shift-stage clutch control pressure generated from clutch control pressure solenoid 82, and thus there is no power transmission through the AMT to the drive road wheels. Accordingly, there is no occurrence of an abnormal situation where the vehicle begins to move against the driver's intention simultaneously with an engine start-up, even when the driver selects the N range for starting up engine E.

In contrast, under an abnormal state, that is, in the presence of the "undesirably-kept-engaged automatic clutch failure" that first clutch CA, associated with odd shift stages, remains engaged undesirably, odd-shift-stage pressure Po is produced based on working oil (serving as a working medium) discharged from engine-drive oil pump 4 just after completion of the engine start-up. At this time, due to the failed clutch control system, clutch control pressure solenoid 82 tends to undesirably route the produced odd-shift-stage pressure Po to first clutch CA as a clutch control pressure. Just before the engine start-up from the vehicle stand-still state, usually, first clutch CA must be kept released. However, by odd-shift-stage pressure Po undesirably routed to first clutch CA due to the "undesirably-kept-engaged automatic clutch failure", in other words, due to a continuous supply of odd-shift-stage clutch control pressure from clutch control pressure solenoid 82 to first clutch CA, first clutch CA is still maintained at the engaged state. On the other hand, either one of actuator solenoids 73-74, is energized responsively to a control command signal from AMT controller 47, such that gear shifting is made in a direction that the "starting-period shift-stage thrown state" is canceled, by application of odd-shift-stage pressure Po supplied through the energized actuator solenoid (73 or 74) associated with the thrown odd shift stage. During the time period from the beginning of the previously-noted gear shifting for cancellation of the "starting-period shift-stage thrown state" to the completion of the gear shifting, under the abnormal state (owing to the "undesirably-kept-engaged automatic clutch failure"), first clutch CA is continuously kept engaged, and thus there is a power transmission through the AMT to the drive road wheels. Accordingly, there is a possibility that the vehicle begins to move against the driver's intention simultaneously with the engine start-up, even when the driver selects the N range for starting up the engine.

[Countermeasure Against Abnormality in Automatic Clutch, Performed by Shift Control System of Embodiment]

Figure 4:
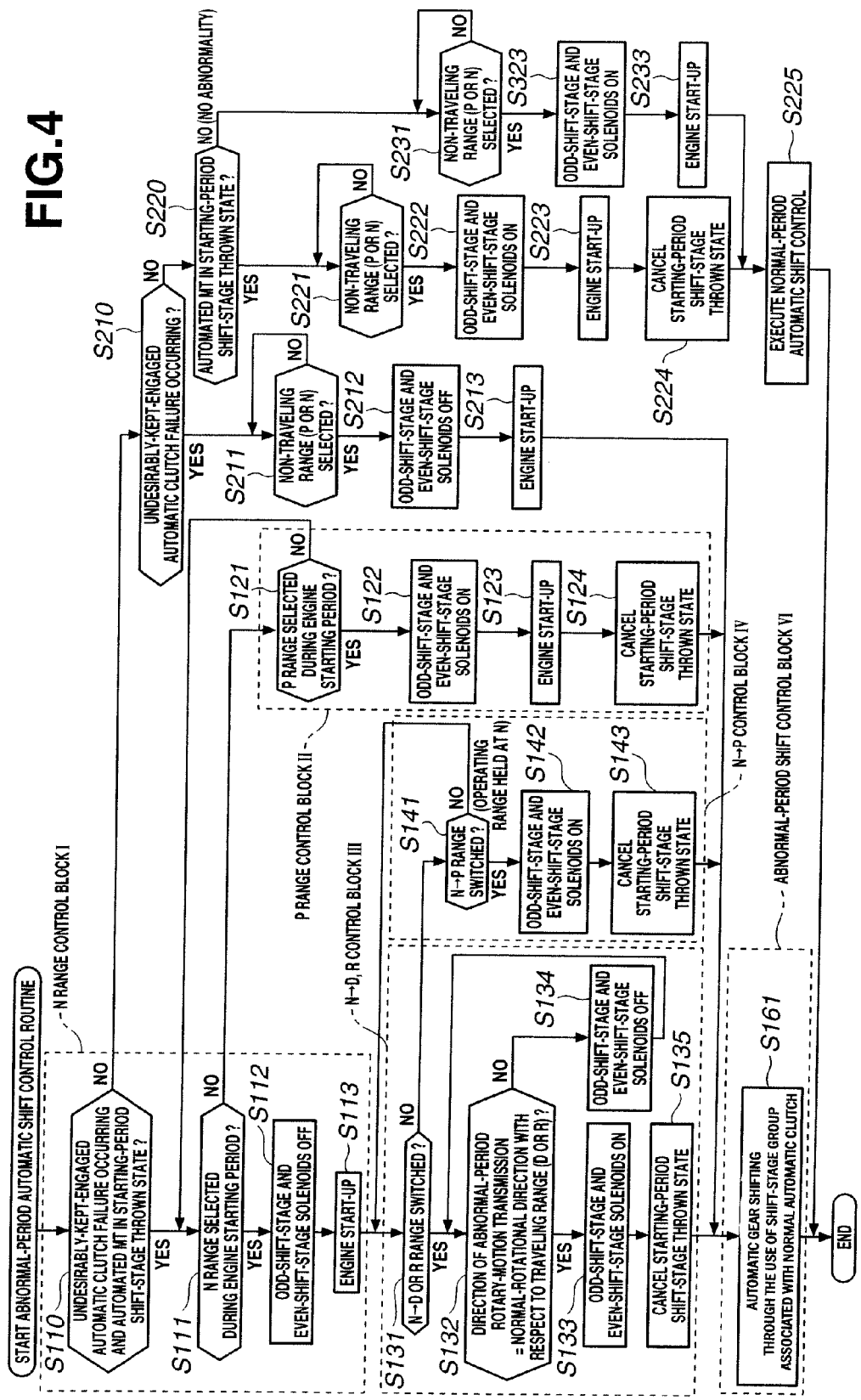
FIG. 4 is a flowchart showing an abnormal-period automatic shift control program executed within an automated-manual-transmission (AMT) controller incorporated in the shift control system of the twin-clutch automated manual transmission of the embodiment, in the presence of an "undesirably-kept-engaged automatic clutch failure".

To avoid the previously-discussed abnormal situation, that is, to prevent the vehicle from beginning to move against the driver's intention simultaneously with an engine start-up, in the shift control system of the embodiment, AMT controller 47 executes abnormal-period automatic shift control as hereunder described in detail in reference to the flowchart of FIG. 4.

The abnormal-period shift control program of FIG. 4 is executed once at the time when the ignition switch is turned ON by the driver for starting up engine E. At the point of time when the abnormal-period shift control program of FIG. 4 has terminated, the starting-up operation of engine E has also been completed (see steps S113, S123, S213, S223, and S233) as described later.

At step S110, executed just after the ignition switch is turned to ON (an ON position), in other words, at the beginning of engine start-up, a check is made to determine whether the previously-discussed "undesirably-kept-engaged automatic clutch failure" that either first clutch CA or second clutch CB remains engaged undesirably, occurs. At the same time, a check is made to determine, based on signals from four shift position sensors 55-58, whether the AMT has already been thrown into a certain shift stage, in other words, the AMT has already been conditioned in the "starting-period shift-stage thrown state" even at an early stage of engine start-up. Thus, step S110 serves as both undesirably-kept-engaged automatic clutch failure detection means (or an undesirably-kept-engaged automatic clutch failure detecting section) and starting-period shift-stage thrown state detection means (or a starting-period shift-stage thrown state detecting section).

When the answer to step S110 is in the affirmative (YES), that is, in the presence of the "undesirably-kept-engaged automatic clutch failure" and when the AMT is in the "starting-period shift-stage thrown state" even at the early stage of engine start-up, AMT controller 47 determines that there is a possibility that the vehicle begins to move against the driver's intention even during the engine starting period. Thus, to avoid such an abnormal situation that the vehicle begins to move against the driver's intention even during the engine starting period, the control routine proceeds from step S110 to step S111, and then flows to the subsequent steps.

At step S111, a check is made to determine, based on a signal from the range position sensor, whether the N range is selected during the engine starting period.

Under the normal state of the AMT control system, in the presence of the selection of the N range, the AMT is shifted into a neutral state where power transmission through the AMT is disabled, but rotation of transmission output shaft 11 is not mechanically restricted by the parking lock pawl.

When the answer to step S111 is affirmative (YES), that is, when AMT controller 47 determines that the selected operating range is the N range during the engine starting period, the routine proceeds from step S111 to step S112.

At step S112, odd-shift-stage pressure solenoid 78 and even-shift-stage pressure solenoid 77 are both de-energized (OFF). After step S112, step S113 occurs.

At step S113, the ignition switch is turned past ON (an ON position) to START (a START position), for starting up engine E. After engine E has been started up, the driver looses his or her hold on the ignition switch (i.e., the ignition key), and then the ignition switch self-returns from START to ON, so that engine E continues to run.

After engine E has been started up, engine-drive oil pump 4 discharges working oil, and therefore the AMT control system can perform automatic gear shifting (automatic shift control), using working oil discharged from the engine-drive pump as a working medium.

As discussed previously, through step S112, odd-shift-stage pressure solenoid 78 and even-shift-stage pressure solenoid 77 are both de-energized (OFF), and thus there is no generation of odd-shift-stage pressure Po created by odd-shift-stage pressure solenoid 78 and simultaneously there is no generation of even-shift-stage pressure Pe created by even-shift-stage pressure solenoid 77, even when engine-drive oil pump 4 is discharging working oil after completion of the engine start-up through step S113.

Therefore, even when, of four actuator solenoids 71-74, the actuator solenoid related to the "starting-period shift-stage thrown state" is energized (ON) by AMT controller 47 in order to supply odd-shift-stage pressure Po or even-shift-stage pressure Pe to the corresponding shift actuator (either of shift actuators 50, 52, 53, and 54), automatic gear shifting cannot be made in a direction that the "starting-period shift-stage thrown state" is canceled, because of neither generation of odd-shift-stage pressure Po created by odd-shift-stage pressure solenoid 78 nor generation of even-shift-stage pressure Pe created by even-shift-stage pressure solenoid 77. As a result, it is impossible to shift the AMT from the "starting-period shift-stage thrown state" to the neutral state.

On the other hand, owing to the "undesirably-kept-engaged automatic clutch failure" that either first clutch CA or second clutch CB remains engaged undesirably, the clutch control pressure solenoid (either solenoid 82 or solenoid 81), related to the failed clutch control system, tends to route either odd-shift-stage pressure Po or even-shift-stage pressure Pe to the clutch (either first clutch CA or second clutch CB), related to the failed clutch control system, as a clutch control pressure. However, because of neither generation of odd-shift-stage pressure Po created by odd-shift-stage pressure solenoid 78 de-energized (OFF) nor generation of even-shift-stage pressure Pe created by even-shift-stage pressure solenoid 77 de-energized (OFF), there is no risk that the clutch (either first clutch CA or second clutch CB), related to the failed clutch control system, is maintained undesirably at its engaged state. That is to say, in a similar manner to the engine stopped state, the automatic clutch (either one of first and second clutches CA-CB), related to the failed (abnormal) clutch control system, can be shifted to and kept at the disengaged state in the same manner as the other automatic clutch, related to the unfailed (normal) clutch control system.

Accordingly, even when, owing to neither generation of odd-shift-stage pressure Po nor generation of even-shift-stage pressure Pe, automatic gear shifting cannot be made in a direction that the "starting-period shift-stage thrown state" is canceled, and thus the AMT remains kept in the "starting-period shift-stage thrown state", there is no possibility of transmission of power produced by engine E started up through step S113 to transmission output shaft 11. Thus, it is possible to avoid an abnormal situation where the vehicle begins to move against the driver's intention simultaneously with an engine start-up even when the driver selects the N range for stopping.

As set forth above, steps S111, S112, and S113, together with even-shift-stage pressure solenoid 77 and odd-shift-stage pressure solenoid 78, serve as neutral-range-period abnormality countermeasure means (or a neutral-range-period abnormality countermeasure section).

Conversely when AMT controller 47 determines that the selected operating range of the AMT is not the N range, through step S111 of an N-range control block I containing steps S110-S113, the routine proceeds to step S121 of a P-range control block II containing steps S121-S124.

At step S121, a check is made to determine, whether the selected operating range of the AMT is the P range during the engine starting period.

Under the normal state of the AMT control system, in the presence of the selection of the P range, the AMT is shifted into a parking state where power transmission through the AMT is disabled, and rotation of transmission output shaft 11 is mechanically restricted by the parking lock pawl.

When the answer to step S121 is affirmative (YES), that is, when AMT controller 47 determines that the selected operating range is the P range during the engine starting period, the routine proceeds from step S121 to step S122. Conversely when the answer to step S121 is negative (NO), that is, in the absence of the selection of the P range during the engine starting period, the routine returns from step S121 to step S111, so as to put the AMT control system on standby, until the non-traveling range (either the P or N range) is selected.

At step S122, odd-shift-stage pressure solenoid 78 and even-shift-stage pressure solenoid 77 are both energized (ON). After step S122, step S123 occurs.

At step S123, the ignition switch is turned past ON (an ON position) to START (a START position), for starting up engine E.

As discussed previously, through step S122, odd-shift-stage pressure solenoid 78 and even-shift-stage pressure solenoid 77 are both energized (ON), and thus odd-shift-stage pressure Po can be created by odd-shift-stage pressure solenoid 78 and simultaneously even-shift-stage pressure Pe can be created by even-shift-stage pressure solenoid 77, as usual, utilizing working oil discharged from engine-drive oil pump 4 as a working medium, after completion of the engine start-up through step S123. After step S123, step S124 occurs.

At step S124, of four actuator solenoids 71-74, the actuator solenoid related to the "starting-period shift-stage thrown state" is energized (ON) by AMT controller 47, and then odd-shift-stage pressure Po or even-shift-stage pressure Pe is supplied to the corresponding shift actuator (either of shift actuators 50, 52, 53, and 54), such that automatic gear shifting is made in a direction that the "starting-period shift-stage thrown state" is canceled. In this manner, the AMT can be shifted from the "starting-period shift-stage thrown state" to the neutral state.

On the other hand, owing to the "undesirably-kept-engaged automatic clutch failure" that either first clutch CA or second clutch CB remains engaged undesirably, the clutch control pressure solenoid (either solenoid 82 or solenoid 81), related to the failed clutch control system, tends to route either odd-shift-stage pressure Po or even-shift-stage pressure Pe to the clutch (either first clutch CA or second clutch CB), related to the failed clutch control system, as a clutch control pressure. Just before the engine start-up from the vehicle stand-still state, usually, the automatic clutches must be kept released. However, by the shift-stage pressure (odd-shift-stage pressure Po or even-shift-stage pressure Pe) undesirably routed to the clutch (first clutch CA or second clutch CB), related to the failed clutch control system, due to the "undesirably-kept-engaged automatic clutch failure", in other words, due to a continuous supply of the clutch control pressure (the odd-shift-stage clutch control pressure or the even-shift-stage clutch control pressure) from the clutch control pressure solenoid (either solenoid 82 or solenoid 81), to the malfunctioning clutch (first clutch CA or second clutch CB), the clutch, related to the failed clutch control system, is still maintained at the engaged state.

During the time period from the beginning of the previously-noted gear shifting for cancellation of the "starting-period shift-stage thrown state" to the completion of the gear shifting, with the malfunctioning clutch (first clutch CA or second clutch CB) remaining engaged undesirably, engine power may be unintendedly transmitted to transmission output shaft 11.

However, in the P range, rotation of transmission output shaft 11 is mechanically restricted by the parking lock pawl installed in the AMT, and whereby there is no delivery of engine power, transmitted to transmission output shaft 11, to the drive road wheels. Thus, it is possible to avoid an abnormal situation where the vehicle begins to move against the driver's intention simultaneously with an engine start-up, even when the driver selects the P range for parking.

As discussed above, in the P range, the "starting-period shift-stage thrown state" is canceled (see step S124), and the AMT is shifted into the neutral state where power transmission through the AMT is disabled. Hence, as explained in detail in reference to step S161 (described later), when switching from the P range to the traveling range, for example, either the D or R range (see the flow from step S124 to step S161), automatic gear shifting can be made through the use of the shift-stage group (either the odd shift-stage group or the even shift-stage group) associated with the clutch (either first clutch CA or second clutch CB) included in the unfailed clutch control system in which the "undesirably-kept-engaged automatic clutch failure" does not occur. Thus, it is possible to avoid an undesirable situation where the vehicle is unable to travel.

As can be appreciated from the above, steps S121-S122, together with even-shift-stage pressure solenoid 77 and odd-shift-stage pressure solenoid 78, serve as parking-range-period abnormality countermeasure means (or a parking-range-period abnormality countermeasure section).

After completion of the engine start-up through step S113 of the N-range control block I, the routine proceeds to step S131 of an N→D, R control block III containing steps S131-S135.

At step S131, a check is made to determine whether switching from the N range to the traveling range (either the D or R range) occurs after completion of the engine start-up. In other words, a check is made to determine whether the selected operating range of the AMT becomes the traveling range (either the D or R range) after completion of the engine start-up. When the answer to step S131 is affirmative (YES), that is, in the presence of the selection of the traveling range after completion of the engine start-up, the routine proceeds from step S131 to step S132.

At step S132, a check is made to determine whether a direction of abnormal-period rotary-motion transmission, which direction is determined based on a combination of (i) the "undesirably-kept-engaged automatic clutch failure" (an undesirably-kept-engaged first clutch CA failure or an undesirably-kept-engaged second clutch CB failure) and (ii) the "starting-period shift-stage thrown state" (a starting-period forward-shift-stage thrown state or a starting-period reverse-shift-stage thrown state), both {(i)+(ii)} of which have already been determined via step S110, is a "normal-rotational direction" or a "reveres-rotational direction", with respect to the vehicle traveling range (either the forward-traveling range, i.e., the drive (D) range, or the reverse-traveling range, i.e., the reverse (R) range) switched from the N range.

Here, the "normal-rotational direction" means that (1) the direction of abnormal-period rotary-motion transmission, determined based on a combination of the "undesirably-kept-engaged automatic clutch failure" and the "starting-period shift-stage thrown state" is identical to a direction of forward-rotation transmission, and the selected traveling range switched from the N range is the forward-traveling range (i.e., the D range), or (2) the direction of abnormal-period rotary-motion transmission, determined based on a combination of the "undesirably-kept-engaged automatic clutch failure" and the "starting-period shift-stage thrown state" is identical to a direction of reverse-rotation transmission, and the selected traveling range switched from the N range is the reverse-traveling range (i.e., the R range).

In contrast, the "reverse-rotational direction" means that (3) the direction of abnormal-period rotary-motion transmission, determined based on a combination of the "undesirably-kept-engaged automatic clutch failure" and the "starting-period shift-stage thrown state" is identical to a direction of forward-rotation transmission, and the selected traveling range switched from the N range is the reverse-traveling range (i.e., the R range), or (4) the direction of abnormal-period rotary-motion transmission, determined based on a combination of the "undesirably-kept-engaged automatic clutch failure" and the "starting-period shift-stage thrown state" is identical to a direction of reverse-rotation transmission, and the selected traveling range switched from the N range is the forward-traveling range (i.e., the D range).

When the answer to step S132 is negative (NO), that is, when the selected traveling range switched from the N range is the forward-traveling range (i.e., the D range), but the direction of abnormal-period rotary-motion transmission, determined based on a combination of the "undesirably-kept-engaged automatic clutch failure" and the "starting-period shift-stage thrown state" is a direction of reverse-rotation transmission, or when the selected traveling range switched from the N range is the reverse-traveling range (i.e., the R range), but the direction of abnormal-period rotary-motion transmission, determined based on a combination of the "undesirably-kept-engaged automatic clutch failure" and the "starting-period shift-stage thrown state" is a direction of forward-rotation transmission, the routine proceeds from step S132 to step S134.

At step S134, odd-shift-stage pressure solenoid 78 and even-shift-stage pressure solenoid 77 are both de-energized (OFF).

As discussed previously, through step S134, odd-shift-stage pressure solenoid 78 and even-shift-stage pressure solenoid 77 are both de-energized (OFF), and thus there is no generation of odd-shift-stage pressure Po created by odd-shift-stage pressure solenoid 78 and simultaneously there is no generation of even-shift-stage pressure Pe created by even-shift-stage pressure solenoid 77, even when engine-drive oil pump 4 is discharging working oil after completion of the engine start-up through step S113.

Therefore, in a similar manner to the selection of the N range (see the flow from step S111 to step S112 in the N-range control block I of FIG. 4), in the case of both the occurrence of switching to the traveling range (either the D or R range) and the decision result of the "reverse-rotational direction", even when, of four actuator solenoids 71-74, the actuator solenoid related to the "starting-period shift-stage thrown state" is energized (ON) by AMT controller 47 in order to supply odd-shift-stage pressure Po or even-shift-stage pressure Pe to the corresponding shift actuator (either of shift actuators 50, 52, 53, and 54), automatic gear shifting cannot be made in a direction that the "starting-period shift-stage thrown state" is canceled, because of neither generation of odd-shift-stage pressure Po created by odd-shift-stage pressure solenoid 78 nor generation of even-shift-stage pressure Pe created by even-shift-stage pressure solenoid 77. As a result, it is impossible to shift the AMT from the "starting-period shift-stage thrown state" to the neutral state.

On the other hand, owing to the "undesirably-kept-engaged automatic clutch failure" that either first clutch CA or second clutch CB remains engaged undesirably, the clutch control pressure solenoid (either solenoid 82 or solenoid 81), related to the failed clutch control system, tends to route either odd-shift-stage pressure Po or even-shift-stage pressure Pe to the clutch (either first clutch CA or second clutch CB), related to the failed clutch control system, as a clutch control pressure. However, because of neither generation of odd-shift-stage pressure Po created by odd-shift-stage pressure solenoid 78 de-energized (OFF) nor generation of even-shift-stage pressure Pe created by even-shift-stage pressure solenoid 77 de-energized (OFF), there is no risk that the clutch (either first clutch CA or second clutch CB), related to the failed clutch control system, is maintained undesirably at its engaged state. That is to say, in a similar manner to the engine stopped state, the automatic clutch (either one of first and second clutches CA-CB), related to the failed (abnormal) clutch control system, can be shifted to and kept at the disengaged state in the same manner as the other automatic clutch, related to the unfailed (normal) clutch control system.

Accordingly, even when, owing to neither generation of odd-shift-stage pressure Po nor generation of even-shift-stage pressure Pe, automatic gear shifting cannot be made in a direction that the "starting-period shift-stage thrown state" is canceled, and thus the AMT remains kept in the "starting-period shift-stage thrown state", there is no possibility of transmission of engine power to transmission output shaft 11. Thus, it is possible to avoid an abnormal situation where the vehicle begins to move backward simultaneously with an engine start-up against the driver's intention even when the driver selects the D range for forward-traveling, and an abnormal situation where the vehicle begins to move forward simultaneously with an engine start-up against the driver's intention when the driver selects the R range for reverse-traveling.

As set forth above, steps S132 and S134, together with even-shift-stage pressure solenoid 77 and odd-shift-stage pressure solenoid 78, serve as traveling-range-selection-period abnormality countermeasure means (or a traveling-range-selection-period abnormality countermeasure section).

As appreciated from the flow returning from step S134 to step S132, step S134 is repeatedly executed in order to avoid the vehicle from beginning to move in the direction opposite to the vehicle traveling direction based on the driver-selected traveling range simultaneously with an engine start-up, until switching from the decision result of the "reverse-rotational direction" to the decision result of the "normal-rotational direction" occurs by switching the selected traveling range between two different traveling ranges, namely drive (D) and reverse (R).

When the decision result, obtained via step S132, indicates the "normal-rotational direction", that is, the direction of abnormal-period rotary-motion transmission is the same direction as the driver-selected traveling range switched from the N range, more concretely, (1) when the direction of abnormal-period rotary-motion transmission, determined based on a combination of the "undesirably-kept-engaged automatic clutch failure" and the "starting-period shift-stage thrown state" is identical to a direction of forward-rotation transmission, and the selected traveling range switched from the N range is the forward-traveling range (i.e., the D range), or (2) when the direction of abnormal-period rotary-motion transmission, determined based on a combination of the "undesirably-kept-engaged automatic clutch failure" and the "starting-period shift-stage thrown state" is identical to a direction of reverse-rotation transmission, and the selected traveling range switched from the N range is the reverse-traveling range (i.e., the R range), the routine advances from step S132 to step S133.

At step S133, odd-shift-stage pressure solenoid 78 and even-shift-stage pressure solenoid 77 are both energized (ON). Thus, odd-shift-stage pressure Po can be created by odd-shift-stage pressure solenoid 78 and simultaneously even-shift-stage pressure Pe can be created by even-shift-stage pressure solenoid 77, as usual, after completion of the engine start-up (see S113). After step S133, step S134 occurs.

At step S134, of four actuator solenoids 71-74, the actuator solenoid related to the "starting-period shift-stage thrown state" is energized (ON) by AMT controller 47, and then odd-shift-stage pressure Po or even-shift-stage pressure Pe is supplied to the corresponding shift actuator (either of shift actuators 50, 52, 53, and 54), such that automatic gear shifting is made in a direction that the "starting-period shift-stage thrown state" is canceled. In this manner, the AMT can be shifted from the "starting-period shift-stage thrown state" to the neutral state.

As can be appreciated from the above, steps S132 and S134-S135, together with even-shift-stage pressure solenoid 77 and odd-shift-stage pressure solenoid 78, serve as traveling-range-selection-period abnormality countermeasure means (or a traveling-range-selection-period abnormality countermeasure section).

On the other hand, owing to the "undesirably-kept-engaged automatic clutch failure" that either first clutch CA or second clutch CB remains engaged undesirably, the clutch control pressure solenoid (either solenoid 82 or solenoid 81), related to the failed clutch control system, tends to route either odd-shift-stage pressure Po or even-shift-stage pressure Pe to the clutch (either first clutch CA or second clutch CB), related to the failed clutch control system, as a clutch control pressure. Just before the engine start-up from the vehicle stand-still state, usually, the automatic clutches must be kept released. However, by the shift-stage pressure (odd-shift-stage pressure Po or even-shift-stage pressure Pe) undesirably routed to the clutch (first clutch CA or second clutch CB), related to the failed clutch control system, due to the "undesirably-kept-engaged automatic clutch failure", in other words, due to a continuous supply of the clutch control pressure (the odd-shift-stage clutch control pressure or the even-shift-stage clutch control pressure) from the clutch control pressure solenoid (either solenoid 82 or solenoid 81), to the malfunctioning clutch (first clutch CA or second clutch CB), the clutch, related to the failed clutch control system, is still maintained at the engaged state.

During the time period from the beginning of the previously-noted gear shifting for cancellation of the "starting-period shift-stage thrown state" to the completion of the gear shifting (see step S135), with the malfunctioning clutch (first clutch CA or second clutch CB) remaining engaged undesirably, engine power may be unintendedly transmitted to transmission output shaft 11, thereby causing the vehicle to temporarily move forward or backward in the direction of abnormal-period rotary-motion transmission, determined based on a combination of the "undesirably-kept-engaged automatic clutch failure" and the "starting-period shift-stage thrown state".

However, the direction of abnormal-period rotary-motion transmission is identical to the "normal-rotation direction" with respect to the traveling range switched from the N range (see the flow from step S132 to step S133). Thus, during the engine starting period, the driver already anticipates that the vehicle begins to move forward or backward from the point of time when the driver selects the traveling range (either the D or R range) instead of the N range. The traveling motion and traveling direction of the vehicle are based on the selected or intended traveling range by the driver. This eliminates any unnatural feeling that the driver experiences unexpected vehicle-traveling situation.

Returning to step S131 of the N→D, R control block III, when the answer to step S131 is negative (NO), that is, when AMT controller 47 determines that the selected operating range is not the traveling range after completion of the engine start-up through step S113, the routine proceeds from step S131 to step S141 of an N→P control block IV containing steps S141-S143.

At step S141, a check is made to determine whether switching from the N range to the P range occurs after completion of the engine start-up. In other words, a check is made to determine whether the selected operating range of the AMT becomes the parking range (the P range) after completion of the engine start-up.

In the absence of switching from the N range to the P range after completion of the engine start-up, in other words, in the absence of the selection of the P range after completion of the engine start-up, the operating range of the AMT remains kept at the N range and thus the routine returns from step S141 to step S131, so as to put the AMT control system on standby, until switching from the N range to the other range (either the P range or the traveling range) occurs.

When the answer to step S141 is affirmative (YES), that is, when switching from the N range to the P range occurs after completion of the engine start-up, in other words, in the presence of the selection of the P range after completion of the engine start-up, the routine proceeds from step S141 to step S142.

At step S142, odd-shift-stage pressure solenoid 78 and even-shift-stage pressure solenoid 77 are both energized (ON). Thus, odd-shift-stage pressure Po can be created by odd-shift-stage pressure solenoid 78 and simultaneously even-shift-stage pressure Pe can be created by even-shift-stage pressure solenoid 77, as usual, utilizing working oil discharged from engine-drive oil pump 4 as a working medium, after completion of the engine start-up through step S113. After step S142, step S143 occurs.

At step S143, of four actuator solenoids 71-74, the actuator solenoid related to the "starting-period shift-stage thrown state" is energized (ON) by AMT controller 47, and then odd-shift-stage pressure Po or even-shift-stage pressure Pe is supplied to the corresponding shift actuator (either of shift actuators 50, 52, 53, and 54), such that automatic gear shifting is made in a direction that the "starting-period shift-stage thrown state" is canceled. In this manner, the AMT can be shifted from the "starting-period shift-stage thrown state" to the neutral state.

On the other hand, owing to the "undesirably-kept-engaged automatic clutch failure" that either first clutch CA or second clutch CB remains engaged undesirably, the clutch control pressure solenoid (either solenoid 82 or solenoid 81), related to the failed clutch control system, tends to route either odd-shift-stage pressure Po or even-shift-stage pressure Pe to the clutch (either first clutch CA or second clutch CB), related to the failed clutch control system, as a clutch control pressure. Just before the engine start-up from the vehicle stand-still state, usually, the automatic clutches must be kept released. However, by the shift-stage pressure (odd-shift-stage pressure Po or even-shift-stage pressure Pe) undesirably routed to the clutch (first clutch CA or second clutch CB), related to the failed clutch control system, due to the "undesirably-kept-engaged automatic clutch failure", in other words, due to a continuous supply of the clutch control pressure (the odd-shift-stage clutch control pressure or the even-shift-stage clutch control pressure) from the clutch control pressure solenoid (either solenoid 82 or solenoid 81), to the malfunctioning clutch (first clutch CA or second clutch CB), the clutch, related to the failed clutch control system, is still maintained at the engaged state.

During the time period from the beginning of the previously-noted gear shifting for cancellation of the "starting-period shift-stage thrown state" to the completion of the gear shifting, with the malfunctioning clutch (first clutch CA or second clutch CB) remaining engaged undesirably, engine power may be unintendedly transmitted to transmission output shaft 11.

However, in the P range, rotation of transmission output shaft 11 is mechanically restricted by the parking lock pawl installed in the AMT, and whereby there is no delivery of engine power, transmitted to transmission output shaft 11, to the drive road wheels. Thus, it is possible to avoid an abnormal situation where the vehicle begins to move against the driver's intention even when the operating range has been switched from the N range to the P range by the driver for parking.

As discussed above, in the presence of the selection of the P range switched from the N range, the "starting-period shift-stage thrown state" is canceled (see step S143), and the AMT is shifted into the neutral state where power transmission through the AMT is disabled. Hence, as explained in detail in reference to step S161 (described later), when further switching from the P range to the traveling range, for example, either the D or R range (see the flow from step S143 to step S161), automatic gear shifting can be made through the use of the shift-stage group (either the odd shift-stage group or the even shift-stage group) associated with the clutch (either first clutch CA or second clutch CB) included in the unfailed clutch control system in which the "undesirably-kept-engaged automatic clutch failure" does not occur. Thus, it is possible to avoid an undesirable situation where the vehicle is unable to travel.

As can be appreciated from the above, steps S141-S142, together with even-shift-stage pressure solenoid 77 and odd-shift-stage pressure solenoid 78, serve as parking-range-selection-period abnormality countermeasure means (or a parking-range-selection-period abnormality countermeasure section).

After automatic gear shifting for cancellation of the "starting-period shift-stage thrown state" has been completed and thus the AMT has been shifted to the neutral state, through step S124 of the P-range control block II, step S135 of the N→D, R control block III, or step S143 of the N→P control block IV, the routine proceeds to step S161 of an abnormal-period shift control block VI.

At step S161, automatic gear shifting is made through the use of the shift-stage group (either the odd shift-stage group or the even shift-stage group) associated with the normal automatic clutch (either first clutch CA or second clutch CB) included in the unfailed clutch control system in which the "undesirably-kept-engaged automatic clutch failure" does not occur, in the presence of the selection of the traveling range (either the D or R range) for forward-traveling or reverse-traveling.

Hence, it is possible to achieve vehicle traveling, utilizing the shift-step group {either the odd shift-stage group (1st, 3rd, 5th, and reverse gears) or the even shift-stage group (2nd, 4th, and 6th gears)} associated with the clutch (either first clutch CA or second clutch CB) included in the unfailed clutch control system in which the "undesirably-kept-engaged automatic clutch failure" does not occur. Accordingly, it is possible to avoid an undesirable situation where the vehicle is unable to travel.

As can be appreciated from the above, step S161 serves as a part of traveling-range-period abnormality countermeasure means (or a traveling-range-period abnormality countermeasure section).

In the shown embodiment, as can be appreciated from steps S112, S122, S133, S134, and S142, shown in FIG. 4, the presence or absence of generation of odd-shift-stage pressure Po and the presence or absence of generation of even-shift-stage pressure Pe are controlled by on-off settings of odd-shift-stage pressure solenoid 78 and even-shift-stage pressure solenoid 77. That is, the presence or absence of generation of each of odd-shift-stage pressure Po and even-shift-stage pressure Pe can be controlled by only on-off settings of the existing solenoids (i.e., shift-stage pressure solenoids 78 and 77) without additional electromagnetic valves. This contributes to lower system installation time and costs, and reduced manufacturing costs of overall system.

Returning to step S110, when the answer to step S110 is in the negative (NO), that is, in the absence of the "undesirably-kept-engaged automatic clutch failure" or when the AMT is out of the "starting-period shift-stage thrown state", the routine proceeds from step S110 to step S210.

At step S210, a check for the presence or absence of the "undesirably-kept-engaged automatic clutch failure" is made. When the answer to step S210 is affirmative (YES), that is, when the "undesirably-kept-engaged automatic clutch failure" occurs, the routine proceeds from step S210 to step S211. Conversely when the answer to step S210 is negative (NO), that is, when the "undesirably-kept-engaged automatic clutch failure" does not occur, the routine proceeds from step S210 to step S220.

At step S220, a check is made to determine whether the AMT is in the "starting-period shift-stage thrown state". When the answer to step S220 is affirmative (YES), that is, when the AMT is in the "starting-period shift-stage thrown state", the routine proceeds from step S220 to step S221. Conversely when the answer to step S220 is negative (NO), that is, when the AMT is out of the "starting-period shift-stage thrown state", the routine proceeds from step S220 to step S231.

As appreciated, the flow from step S110 via step S210 to step S211 means the occurrence of the "undesirably-kept-engaged automatic clutch failure". The flow from step S110 via steps S210 and S220 to step S221 means that the AMT is in the "starting-period shift-stage thrown state". The flow from step S110 via steps S210 and S220 to step S231 means that there is no occurrence of the "undesirably-kept-engaged automatic clutch failure" and the AMT is out of the "starting-period shift-stage thrown state".

At step S211, a check is made to determine, based on a signal from the range position sensor, whether the selected operating range of the AMT is the non-traveling range (either the P or N range) during the engine starting period. When the answer to step S211 is negative (NO), that is, in the absence of the selection of the non-traveling range (either the P or N range), the routine returns to step S211, so as to put the AMT control system on standby, until the non-traveling range (either the P or N range) is selected. Conversely when the answer to step S211 is affirmative (YES) that is, in the presence of the selection of the non-traveling range (either the P or N range), the routine proceeds from step S211 to step S212.

At step S212, odd-shift-stage pressure solenoid 78 and even-shift-stage pressure solenoid 77 are both de-energized (OFF). After step S212, step S213 occurs.

At step S213, the ignition switch is turned past ON (an ON position) to START (a START position), for starting up engine E.

As discussed previously, through step S212, odd-shift-stage pressure solenoid 78 and even-shift-stage pressure solenoid 77 are both de-energized (OFF), and thus there is no generation of odd-shift-stage pressure Po created by odd-shift-stage pressure solenoid 78 and simultaneously there is no generation of even-shift-stage pressure Pe created by even-shift-stage pressure solenoid 77, even when engine-drive oil pump 4 is discharging working oil after completion of the engine start-up through step S213.

Therefore, even in the presence of the "undesirably-kept-engaged automatic clutch failure" that either first clutch CA or second clutch CB remains engaged undesirably, there is no risk that the clutch (either first clutch CA or second clutch CB), related to the failed clutch control system, is maintained undesirably at its engaged state, because of neither generation of odd-shift-stage pressure Po created by odd-shift-stage pressure solenoid 78 de-energized (OFF) nor generation of even-shift-stage pressure Pe created by even-shift-stage pressure solenoid 77 de-energized (OFF). That is to say, in a similar manner to the engine stopped state, the automatic clutch (either one of first and second clutches CA-CB), related to the failed (abnormal) clutch control system, can be shifted to and kept at the disengaged state in the same manner as the other automatic clutch, related to the unfailed (normal) clutch control system.

After step S213, the routine proceeds to step S161. For instance, when the driver has selected the D range for forward-traveling, via step S161, automatic gear shifting can be made through the use of the shift-stage group associated with the clutch (either first clutch CA or second clutch CB) included in the unfailed clutch control system in which the "undesirably-kept-engaged automatic clutch failure" does not occur. Hence, it is possible to achieve vehicle traveling, utilizing the shift-stage group associated with the clutch (either first clutch CA or second clutch CB) included in the unfailed clutch control system in which the "undesirably-kept-engaged automatic clutch failure" does not occur. Accordingly, it is possible to avoid an undesirable situation where the vehicle is unable to travel.

In a similar manner to step S211, at step S221, a check is made to determine whether the selected operating range of the AMT is the non-traveling range (either the P or N range) during the engine starting period. When the answer to step S221 is negative (NO), that is, in the absence of the selection of the non-traveling range (either the P or N range), the routine returns to step S221, so as to put the AMT control system on standby, until the non-traveling range (either the P or N range) is selected. Conversely when the answer to step S221 is affirmative (YES), that is, in the presence of the selection of the non-traveling range (either the P or N range), the routine proceeds from step S221 to step S222.

At step S222, odd-shift-stage pressure solenoid 78 and even-shift-stage pressure solenoid 77 are both energized (ON). After step S222, step S223 occurs.

At step S223, the ignition switch is turned past ON (an ON position) to START (a START position), for starting up engine E.

As discussed previously, through step S222, odd-shift-stage pressure solenoid 78 and even-shift-stage pressure solenoid 77 are both energized (ON). Thus, odd-shift-stage pressure Po can be created by odd-shift-stage pressure solenoid 78 and simultaneously even-shift-stage pressure Pe can be created by even-shift-stage pressure solenoid 77, as usual, utilizing working oil discharged from engine-drive oil pump 4 as a working medium, after completion of the engine start-up through step S223. After step S223, step S224 occurs.

At step S224, of four actuator solenoids 71-74, the actuator solenoid related to the "starting-period shift-stage thrown state" is energized (ON) by AMT controller 47, and then odd-shift-stage pressure Po or even-shift-stage pressure Pe is supplied to the corresponding shift actuator (either of shift actuators 50, 52, 53, and 54), such that automatic gear shifting is made in a direction that the "starting-period shift-stage thrown state" is canceled. In this manner, the AMT can be shifted from the "starting-period shift-stage thrown state" to the neutral state.

In the case of the flow from step S110 through steps S210 and S220-S223 to step S224, there is no occurrence of the "undesirably-kept-engaged automatic clutch failure", and therefore there is no factor of disturbing automatic gear shifting by the cancellation of the "starting-period shift-stage thrown state" via step S224. Accordingly, after step S224, the routine proceeds to step S225.

At step S225, normal-period automatic shift control (usual automatic shift control) is executed, using both the odd shift-stage group (1st, 3rd, 5th, and reverse gears) and the even shift-stage group (2nd, 4th, and 6th gears). Here, the normal-period automatic shift control means that a desired shift step is determined or retrieved, based on input informational data signals from the vehicle speed sensor and the accelerator opening sensor, from a preprogrammed shift map (or a preprogrammed shift sequence or a preprogrammed shift schedule), and a shift (an upshift or a downshift) from the current shift stage to the desired shift stage is automatically made.

When the decision result of step S210 is negative (i.e., in the absence of the "undesirably-kept-engaged automatic clutch failure") and the decision result of step S220 is negative (i.e., when the AMT is out of the "starting-period shift-stage thrown state"), that is, when there is no abnormality in the AMT control system, the routine proceeds to step S231.

In a manner similar to steps S211 and S221, at step S231, a check is made to determine whether the selected operating range of the AMT is the non-traveling range (either the P or N range) during the engine starting period. When the answer to step S231 is negative (NO), that is, in the absence of the selection of the non-traveling range (either the P or N range), the routine returns to step S231, so as to put the AMT control system on standby, until the non-traveling range (either the P or N range) is selected. Conversely when the answer to step S231 is affirmative (YES), that is, in the presence of the selection of the non-traveling range (either the P or N range), the routine proceeds from step S231 to step S232.

At step S232, odd-shift-stage pressure solenoid 78 and even-shift-stage pressure solenoid 77 are both energized (ON). After step S232, step S233 occurs.

At step S233, the ignition switch is turned past ON (an ON position) to START (a START position), for starting up engine E.

As discussed previously, through step S222, odd-shift-stage pressure solenoid 78 and even-shift-stage pressure solenoid 77 are both energized (ON). Thus, odd-shift-stage pressure Po can be created by odd-shift-stage pressure solenoid 78 and simultaneously even-shift-stage pressure Pe can be created by even-shift-stage pressure solenoid 77, as usual, utilizing working oil discharged from engine-drive oil pump 4 as a working medium, after completion of the engine start-up through step S223. After step S233, the routine proceeds to step S225, so as to execute the normal-period automatic shift control.

[Countermeasure Against Abnormality in Automatic Clutch, Performed by Shift Control System of Modification]

Figure 5:
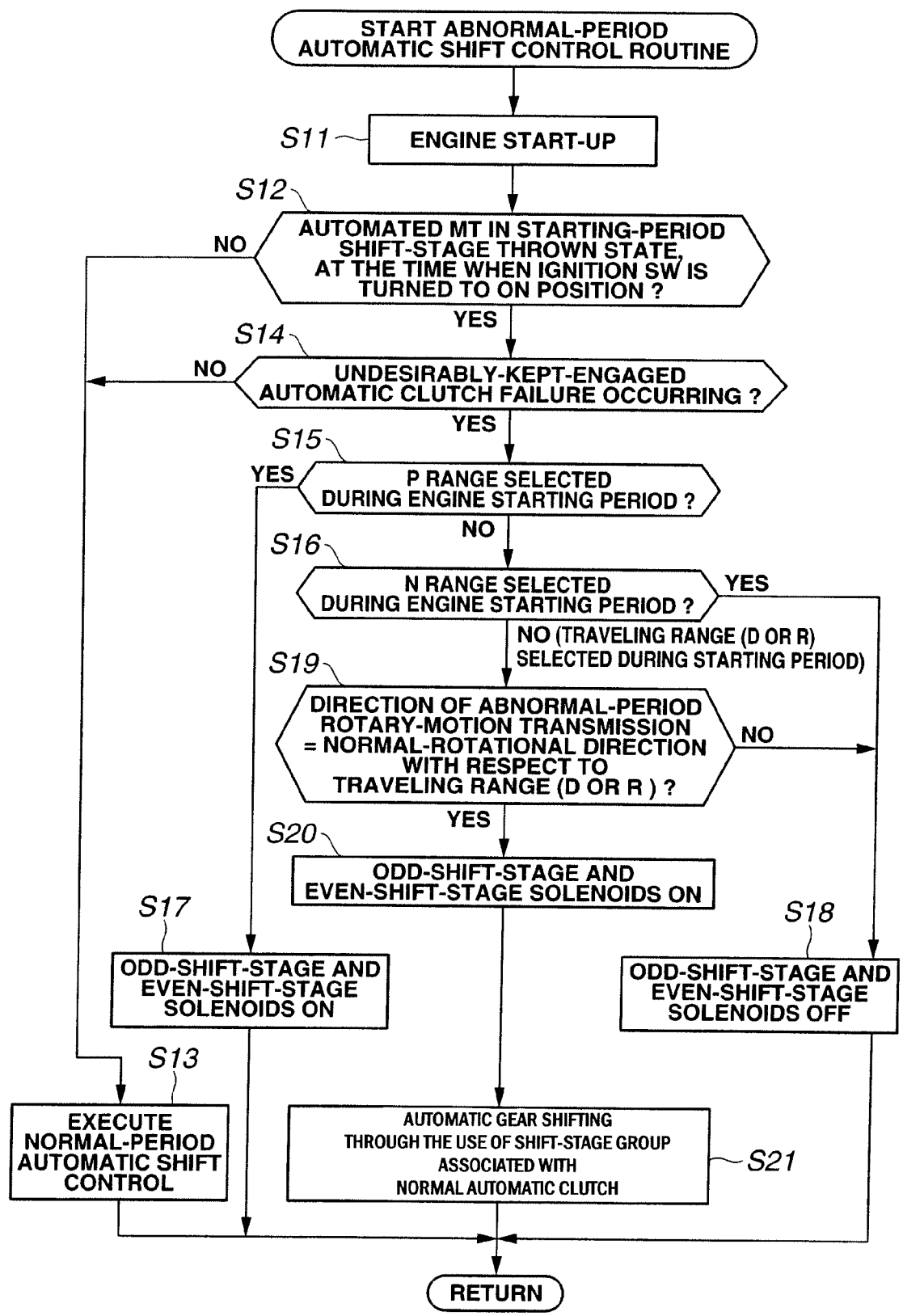
FIG. 5 is a modified flowchart showing a modified abnormal-period automatic shift control program executed within the AMT controller, in the presence of an "undesirably-kept-engaged automatic clutch failure".

To avoid the previously-discussed abnormal situation, that is, to prevent the vehicle from beginning to move against the driver's intention simultaneously with an engine start-up, in the modified shift control system, AMT controller 47 may execute modified abnormal-period automatic shift control as hereunder described in detail in reference to the flowchart of FIG. 5.

The modified abnormal-period shift control program of FIG. 5 is executed once at the time when the ignition switch is turned ON by the driver for starting up engine E.

At step S11, the ignition switch is turned to ON (an ON position), and further turned past ON (the ON position) to START (a START position), for starting up engine E. After engine E has been started up, the driver looses his or her hold on the ignition switch (i.e., the ignition key), and then the ignition switch self-returns from START to ON, so that engine E continues to run. After step S11, step S12 occurs.

After engine E has been started up, engine-drive oil pump 4 discharges working oil, and therefore the AMT control system can perform automatic gear shifting (automatic shift control), using working oil discharged from the engine-drive pump as a working medium.

At step S12, a check is made to determine, based on signals from four shift position sensors 55-58, whether the AMT has already been thrown into a certain shift stage, in other words, the AMT has already been conditioned in the "starting-period shift-stage thrown state", at the time when the ignition switch is turned to ON (the ON position), in other words, at the initial stage of the modified abnormal-period shift control program of FIG. 5.

Assuming that the AMT is out of the "starting-period shift-stage thrown state" during the engine starting period, there is no occurrence of the problem to be solved by the invention, exactly, there is no occurrence of the abnormal situation that the vehicle begins to move against the driver's intention during the engine starting period. Therefore, when the answer to step S12 is negative (NO), that is, when it is determined that the AMT is out of the "starting-period shift-stage thrown state" during the engine starting period, exactly, at the time when the ignition switch is turned to ON (the ON position), the routine proceeds from step S12 to step S13. Step S12 serves as starting-period shift-stage thrown state detection means.

At step S13, normal-period automatic shift control (usual automatic shift control) is executed, using both the odd shift-stage group (1st, 3rd, 5th, and reverse gears) and the even shift-stage group (2nd, 4th, and 6th gears). Here, the normal-period automatic shift control means that a desired shift stage is determined or retrieved, based on input informational data signals from the vehicle speed sensor and the accelerator opening sensor, from a preprogrammed shift map (or a preprogrammed shift sequence or a preprogrammed shift schedule), and a shift from the current shift stage to the desired shift stage is automatically made.

Conversely when the answer to step S12 is affirmative (YES), that is, when it is determined that the AMT is in the "starting-period shift-stage thrown state" during the engine starting period, exactly, at the time when the ignition switch is turned to ON (the ON position), the routine proceeds from step S12 to step S14.

At step S14, a check is made to determine whether the previously-discussed "undesirably-kept-engaged automatic clutch failure" that either first clutch CA or second clutch CB remains engaged undesirably, occurs.

Assuming that the "undesirably-kept-engaged automatic clutch failure" does not occur during the engine starting period, there is no occurrence of the problem to be solved by the invention, exactly, there is no occurrence of the abnormal situation that the vehicle begins to move against the driver's intention during the engine starting period. Therefore, when the answer to step S14 is negative (NO), that is, when it is determined that the "undesirably-kept-engaged automatic clutch failure" does not occur, the routine proceeds from step S14 to step S13, so as to execute the normal-period automatic shift control. Step S14 serves as undesirably-kept-engaged automatic clutch failure detection means.

When the decision result of step S12 is affirmative (i.e., when the AMT is in the "starting-period shift-stage thrown state") and the decision result of step S14 is affirmative (i.e., in the presence of the "undesirably-kept-engaged automatic clutch failure"), AMT controller 47 determines that there is a possibility that the vehicle begins to move against the driver's intention even during the engine starting period. Thus, to avoid such an abnormal situation that the vehicle begins to move against the driver's intention even during the engine starting period, the control routine proceeds from step S14 to step S15, and then flows to the subsequent steps.

At step S15, a check is made to determine, whether the selected operating range of the AMT is the P range during the engine starting period.

At step S16, a check is made to determine, whether the selected operating range of the AMT is the N range during the engine starting period.

Under the normal state of the AMT control system, in the presence of the selection of the P range, the AMT is shifted into a parking state where power transmission through the AMT is disabled, and rotation of transmission output shaft 11 is mechanically restricted by the parking lock pawl. Under the normal state of the AMT control system, in the presence of the selection of the N range, the AMT is shifted into a neutral state where power transmission through the AMT is disabled, and rotation of transmission output shaft 11 is not mechanically restricted by the parking lock pawl.

When the answer to step S15 is affirmative (YES), that is, in the presence of the selection of the P range during the engine starting period, the routine proceeds from step S15 to step S17.

At step S17, odd-shift-stage pressure solenoid 78 and even-shift-stage pressure solenoid 77 are both energized (ON). Accordingly, odd-shift-stage pressure Po can be created by odd-shift-stage pressure solenoid 78 and simultaneously even-shift-stage pressure Pe can be created by even-shift-stage pressure solenoid 77, as usual, utilizing working oil discharged from engine-drive oil pump 4 as a working medium, after completion of the engine start-up.

On the one hand, of four actuator solenoids 71-74, the actuator solenoid related to the "starting-period shift-stage thrown state" is energized (ON) by AMT controller 47, and then odd-shift-stage pressure Po or even-shift-stage pressure Pe is supplied to the corresponding shift actuator (either of shift actuators 50, 52, 53, and 54), such that automatic gear shifting is made in a direction that the "starting-period shift-stage thrown state" is canceled. In this manner, the AMT can be shifted from the "starting-period shift-stage thrown state" to the neutral state.

On the other hand, owing to the "undesirably-kept-engaged automatic clutch failure" that either first clutch CA or second clutch CB remains engaged undesirably, the clutch control pressure solenoid (either solenoid 82 or solenoid 81), related to the failed clutch control system, tends to route either odd-shift-stage pressure Po or even-shift-stage pressure Pe to the clutch (either first clutch CA or second clutch CB), related to the failed clutch control system, as a clutch control pressure. Just before the engine start-up from the vehicle stand-still state, usually, the automatic clutches must be kept released. However, by the shift-stage pressure (odd-shift-stage pressure Po or even-shift-stage pressure Pe) undesirably routed to the clutch (first clutch CA or second clutch CB), related to the failed clutch control system, due to the "undesirably-kept-engaged automatic clutch failure", in other words, due to a continuous supply of the clutch control pressure (the odd-shift-stage clutch control pressure or the even-shift-stage clutch control pressure) from the clutch control pressure solenoid (either solenoid 82 or solenoid 81), to the malfunctioning clutch (first clutch CA or second clutch CB), the clutch, related to the failed clutch control system, is still maintained at the engaged state.

During the time period from the beginning of the previously-noted gear shifting for cancellation of the "starting-period shift-stage thrown state" to the completion of the gear shifting, with the malfunctioning clutch (first clutch CA or second clutch CB) remaining engaged undesirably, engine power may be unintendedly transmitted to transmission output shaft 11.

However, in the P range, rotation of transmission output shaft 11 is mechanically restricted by the parking lock pawl installed in the AMT, and whereby there is no delivery of engine power, transmitted to transmission output shaft 11, to the drive road wheels. Thus, it is possible to avoid an abnormal situation where the vehicle begins to move against the driver's intention simultaneously with an engine start-up even when the driver selects the P range for parking.

As discussed above, in the P range, the "starting-period shift-stage thrown state" is canceled (via step S17), and the AMT is shifted into the neutral state where power transmission through the AMT is disabled. Hence, as explained in detail in reference to step S21 (described later), when switching from the P range to the traveling range, for example, either the D or R range (see the flow from step S15 through steps S16, and S19-S20 (described later) to step S21), automatic gear shifting can be made through the use of the shift-stage group (either the odd shift-stage group or the even shift-stage group) associated with the clutch (either first clutch CA or second clutch CB) included in the unfailed clutch control system in which the "undesirably-kept-engaged automatic clutch failure" does not occur. Thus, it is possible to avoid an undesirable situation where the vehicle is unable to travel.

As can be appreciated from the above, steps S15 and S17, together with even-shift-stage pressure solenoid 77 and odd-shift-stage pressure solenoid 78, serve as parking-range-period abnormality countermeasure means (or a parking-range-period abnormality countermeasure section).

Returning to step S16, when the answer to step S16 is affirmative (YES), that is, in the presence of the selection of the N range during the engine starting period, the routine proceeds from step S16 to step S18.

At step S18, odd-shift-stage pressure solenoid 78 and even-shift-stage pressure solenoid 77 are both de-energized (OFF). With odd-shift-stage pressure solenoid 78 and even-shift-stage pressure solenoid 77 both de-energized (OFF), there is no generation of odd-shift-stage pressure Po created by odd-shift-stage pressure solenoid 78 and simultaneously there is no generation of even-shift-stage pressure Pe created by even-shift-stage pressure solenoid 77, even when engine-drive oil pump 4 is discharging working oil after completion of the engine start-up.

Therefore, in the presence of the selection of the N range during the engine starting period, even when, of four actuator solenoids 71-74, the actuator solenoid related to the "starting-period shift-stage thrown state" is energized (ON) by AMT controller 47 in order to supply odd-shift-stage pressure Po or even-shift-stage pressure Pe to the corresponding shift actuator (either of shift actuators 50, 52, 53, and 54), automatic gear shifting cannot be made in a direction that the "starting-period shift-stage thrown state" is canceled, because of neither generation of odd-shift-stage pressure Po created by odd-shift-stage pressure solenoid 78 nor generation of even-shift-stage pressure Pe created by even-shift-stage pressure solenoid 77. As a result, it is impossible to shift the AMT from the "starting-period shift-stage thrown state" to the neutral state.

On the other hand, owing to the "undesirably-kept-engaged automatic clutch failure" that either first clutch CA or second clutch CB remains engaged undesirably, the clutch control pressure solenoid (either solenoid 82 or solenoid 81), related to the failed clutch control system, tends to route either odd-shift-stage pressure Po or even-shift-stage pressure Pe to the clutch (either first clutch CA or second clutch CB), related to the failed clutch control system, as a clutch control pressure. However, because of neither generation of odd-shift-stage pressure Po created by odd-shift-stage pressure solenoid 78 de-energized (OFF) nor generation of even-shift-stage pressure Pe created by even-shift-stage pressure solenoid 77 de-energized (OFF), there is no risk that the clutch (either first clutch CA or second clutch CB), related to the failed clutch control system, is maintained undesirably at its engaged state. That is to say, in a similar manner to the engine stopped state, the automatic clutch (either one of first and second clutches CA-CB), related to the failed (abnormal) clutch control system, can be shifted to and kept at the disengaged state in the same manner as the other automatic clutch, related to the unfailed (normal) clutch control system.

Accordingly, even when, owing to neither generation of odd-shift-stage pressure Po nor generation of even-shift-stage pressure Pe, automatic gear shifting cannot be made in a direction that the "starting-period shift-stage thrown state" is canceled, and thus the AMT remains kept in the "starting-period shift-stage thrown state", there is no possibility of transmission of engine power to transmission output shaft 11. Thus, it is possible to avoid an abnormal situation where the vehicle begins to move against the driver's intention simultaneously with an engine start-up even when the driver selects the N range for stopping.

As set forth above, steps S16 and S18, together with even-shift-stage pressure solenoid 77 and odd-shift-stage pressure solenoid 78, serve as neutral-range-period abnormality countermeasure means (or a neutral-range-period abnormality countermeasure section).

Returning to step S16, when the answer to step S16 is negative (NO), that is, when it is determined that the selected operating range of the AMT is neither the N range nor the P range during the engine starting period, in other words, when the selected operating range of the AMT is the traveling range (either the D or R range), the routine proceeds from step S16 to step S19.

At step S19, a check is made to determine whether a direction of abnormal-period rotary-motion transmission, which direction is determined based on a combination of (i) the "starting-period shift-stage thrown state" (a starting-period forward-shift-stage thrown state or a starting-period reverse-shift-stage thrown state) and (ii) the "undesirably-kept-engaged automatic clutch failure" (an undesirably-kept-engaged first clutch CA failure or an undesirably-kept-engaged second clutch CB failure), both {(i)+(ii)} of which have already been determined via respective steps S12 and S14, is a "normal-rotational direction" or a "reveres-rotational direction", with respect to the selected vehicle traveling range (either the forward-traveling range, i.e., the drive (D) range, or the reverse-traveling range, i.e., the reverse (R) range).

When the answer to step S19 is negative (NO), that is, when the selected traveling range is the forward-traveling range (i.e., the D range), but the direction of abnormal-period rotary-motion transmission, determined based on a combination of the "undesirably-kept-engaged automatic clutch failure" and the "starting-period shift-stage thrown state" is a direction of reverse-rotation transmission, or when the selected traveling range is the reverse-traveling range (i.e., the R range), but the direction of abnormal-period rotary-motion transmission, determined based on a combination of the "undesirably-kept-engaged automatic clutch failure" and the "starting-period shift-stage thrown state" is a direction of forward-rotation transmission, the routine proceeds from step S19 to step S18. As previously discussed, through step S18, odd-shift-stage pressure solenoid 78 and even-shift-stage pressure solenoid 77 are both de-energized (OFF). With odd-shift-stage pressure solenoid 78 and even-shift-stage pressure solenoid 77 both de-energized (OFF), there is no generation of odd-shift-stage pressure Po created by odd-shift-stage pressure solenoid 78 and simultaneously there is no generation of even-shift-stage pressure Pe created by even-shift-stage pressure solenoid 77, even when engine-drive oil pump 4 is discharging working oil after completion of the engine start-up.

Therefore, in a similar manner to the selection of the N range (see the flow from step S16 to step S18 in FIG. 5), in the case of both the selection of the traveling range (either the D or R range) and the decision result of the "reverse-rotational direction", even when, of four actuator solenoids 71-74, the actuator solenoid related to the "starting-period shift-stage thrown state" is energized (ON) by AMT controller 47 in order to supply odd-shift-stage pressure Po or even-shift-stage pressure Pe to the corresponding shift actuator (either of shift actuators 50, 52, 53, and 54), automatic gear shifting cannot be made in a direction that the "starting-period shift-stage thrown state" is canceled, because of neither generation of odd-shift-stage pressure Po created by odd-shift-stage pressure solenoid 78 nor generation of even-shift-stage pressure Pe created by even-shift-stage pressure solenoid 77. As a result, it is impossible to shift the AMT from the "starting-period shift-stage thrown state" to the neutral state.

On the other hand, owing to the "undesirably-kept-engaged automatic clutch failure" that either first clutch CA or second clutch CB remains engaged undesirably, the clutch control pressure solenoid (either solenoid 82 or solenoid 81), related to the failed clutch control system, tends to route either odd-shift-stage pressure Po or even-shift-stage pressure Pe to the clutch (either first clutch CA or second clutch CB), related to the failed clutch control system, as a clutch control pressure. However, because of neither generation of odd-shift-stage pressure Po created by odd-shift-stage pressure solenoid 78 de-energized (OFF) nor generation of even-shift-stage pressure Pe created by even-shift-stage pressure solenoid 77 de-energized (OFF), there is no risk that the clutch (either first clutch CA or second clutch CB), related to the failed clutch control system, is maintained undesirably at its engaged state. That is to say, in a similar manner to the engine stopped state, the automatic clutch (either one of first and second clutches CA-CB), related to the failed (abnormal) clutch control system, can be shifted to and kept at the disengaged state in the same manner as the other automatic clutch, related to the unfailed (normal) clutch control system.

Accordingly, even when, owing to neither generation of odd-shift-stage pressure Po nor generation of even-shift-stage pressure Pe, automatic gear shifting cannot be made in a direction that the "starting-period shift-stage thrown state" is canceled, and thus the AMT remains kept in the "starting-period shift-stage thrown state", there is no possibility of transmission of engine power to transmission output shaft 11. Thus, it is possible to avoid an abnormal situation where the vehicle begins to move backward simultaneously with an engine start-up against the driver's intention even when the driver selects the D range for forward-traveling, and an abnormal situation where the vehicle begins to move forward simultaneously with an engine start-up against the driver's intention when the driver selects the R range for reverse-traveling.

As set forth above, steps S19 and S18, together with even-shift-stage pressure solenoid 77 and odd-shift-stage pressure solenoid 78, serve as traveling-range-period abnormality countermeasure means (or a traveling-range-period abnormality countermeasure section).

Conversely when the answer to step S19 is affirmative (YES), that is, when the decision result, obtained via step S19, indicates the "normal-rotational direction", that is, the direction of abnormal-period rotary-motion transmission is the same direction as the driver-selected traveling range, more concretely, (1) when the direction of abnormal-period rotary-motion transmission, determined based on a combination of the "undesirably-kept-engaged automatic clutch failure" and the "starting-period shift-stage thrown state" is identical to a direction of forward-rotation transmission, and the selected traveling range is the forward-traveling range (i.e., the D range), or (2) when the direction of abnormal-period rotary-motion transmission, determined based on a combination of the "undesirably-kept-engaged automatic clutch failure" and the "starting-period shift-stage thrown state" is identical to a direction of reverse-rotation transmission, and the selected traveling range is the reverse-traveling range (i.e., the R range), the routine advances from step S19 to step S20.

At step S20, odd-shift-stage pressure solenoid 78 and even-shift-stage pressure solenoid 77 are both energized (ON). Thus, odd-shift-stage pressure Po can be created by odd-shift-stage pressure solenoid 78 and simultaneously even-shift-stage pressure Pe can be created by even-shift-stage pressure solenoid 77, as usual, after completion of the engine start-up.

On the one hand, of four actuator solenoids 71-74, the actuator solenoid related to the "starting-period shift-stage thrown state" is energized (ON) by AMT controller 47, and then odd-shift-stage pressure Po or even-shift-stage pressure Pe is supplied to the corresponding shift actuator (either of shift actuators 50, 52, 53, and 54), such that automatic gear shifting is made in a direction that the "starting-period shift-stage thrown state" is canceled. In this manner, the AMT can be shifted from the "starting-period shift-stage thrown state" to the neutral state.

On the other hand, owing to the "undesirably-kept-engaged automatic clutch failure" that either first clutch CA or second clutch CB remains engaged undesirably, the clutch control pressure solenoid (either solenoid 82 or solenoid 81), related to the failed clutch control system, tends to route either odd-shift-stage pressure Po or even-shift-stage pressure Pe to the clutch (either first clutch CA or second clutch CB), related to the failed clutch control system, as a clutch control pressure. Just before the engine start-up from the vehicle stand-still state, usually, the automatic clutches must be kept released. However, by the shift-stage pressure (odd-shift-stage pressure Po or even-shift-stage pressure Pe) undesirably routed to the clutch (first clutch CA or second clutch CB), related to the failed clutch control system, due to the "undesirably-kept-engaged automatic clutch failure", in other words, due to a continuous supply of the clutch control pressure (the odd-shift-stage clutch control pressure or the even-shift-stage clutch control pressure) from the clutch control pressure solenoid (either solenoid 82 or solenoid 81), to the malfunctioning clutch (first clutch CA or second clutch CB), the clutch, related to the failed clutch control system, is still maintained at the engaged state.

During the time period from the beginning of the previously-noted gear shifting for cancellation of the "starting-period shift-stage thrown state" to the completion of the gear shifting, with the malfunctioning clutch (first clutch CA or second clutch CB) remaining engaged undesirably, engine power may be unintendedly transmitted to transmission output shaft 11, thereby causing the vehicle to temporarily move forward or backward in the direction of abnormal-period rotary-motion transmission, determined based on a combination of the "undesirably-kept-engaged automatic clutch failure" and the "starting-period shift-stage thrown state".

However, the direction of abnormal-period rotary-motion transmission is identical to the "normal-rotation direction" with respect to the selected traveling range (see the flow from step S19 to step S20). Thus, during the engine starting period, the driver already anticipates that the vehicle begins to move forward or backward from the point of time when the driver selects the traveling range (either the D or R range). The traveling motion and traveling direction of the vehicle are based on the selected or intended traveling range by the driver. This eliminates any unnatural feeling that the driver experiences unexpected vehicle-traveling situation.

As set forth above, steps S19 and S20, together with even-shift-stage pressure solenoid 77 and odd-shift-stage pressure solenoid 78, serve as traveling-range-period abnormality countermeasure means (or a traveling-range-period abnormality countermeasure section).

At the subsequent step S21, as previously discussed, the AMT has been shifted into the neutral state by cancellation of the "starting-period shift-stage thrown state", and thus automatic gear shifting can be made by switching between shift stages in the shift-stage group (either the odd shift-stage group or the even shift-stage group) associated with the clutch (either first clutch CA or second clutch CB) included in the unfailed clutch control system in which the "undesirably-kept-engaged automatic clutch failure" does not occur. Thus, it is possible to avoid an undesirable situation where the vehicle is unable to travel.

Thus, step S21 also serves as traveling-range-period abnormality countermeasure means (or a traveling-range-period abnormality countermeasure section).

In the modified shift control system, as can be appreciated from steps S17, S18, and S20, shown in FIG. 5, the presence or absence of generation of odd-shift-stage pressure Po and the presence or absence of generation of even-shift-stage pressure Pe are controlled by on-off settings of odd-shift-stage pressure solenoid 78 and even-shift-stage pressure solenoid 77. That is, the presence or absence of generation of each of odd-shift-stage pressure Po and even-shift-stage pressure Pe can be controlled by only on-off settings of the existing solenoids (i.e., shift-stage pressure solenoids 78 and 77) without additional electromagnetic valves. This contributes to lower system installation time and costs, and reduced manufacturing costs of overall system.

In both the abnormal-period automatic shift control system (see FIG. 4) of the embodiment and the modified abnormal-period automatic shift control system (see FIG. 5), the countermeasure against the "undesirably-kept-engaged automatic clutch failure" that an automatic clutch remains engaged undesirably, is exemplified in a twin-clutch automated manual transmission in which either first clutch CA or second clutch CB remains engaged undesirably, prior to an engine start-up. As can be appreciated from the above, the fundamental concept of the present invention can be applied to a single-clutch automated manual transmission as well as a twin-clutch automated manual transmission, in order to avoid or prevent an automotive vehicle from beginning to move against the driver's intention simultaneously with an engine start-up. However, the single-clutch automated manual transmission (AMT) has only one automatic clutch associated with all shift stages and only one clutch control system for the single automatic clutch. Hence, when applying the fundamental concept of the present invention to such a single-clutch AMT, steps S19 and S21 of FIG. 5 (steps S132 and S161 of FIG. 4) are unnecessary. Additionally, odd-shift-stage pressure solenoid 78 and even-shift-stage pressure solenoid 77, shown in steps S17, S18 and S20 of FIG. 5 (shown in steps S112, S122, S133-S134, S142, S212, S222, and S232 of FIG. 4) are replaced with only one, common shift-stage pressure solenoid.

The entire contents of Japanese Patent Application Nos. 2007-302400 (filed Nov. 22, 2007) and 2008-183823 (filed Jul. 15, 2008) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An abnormal-period automatic shift control apparatus of an automated manual transmission of an automotive vehicle in which rotation of an engine is inputted through an automatic clutch, a desired shift stage is realized by automatic-clutch engagement-and-disengagement control and automatic gear shifting for a changeover in a transmission gear train, using working oil from an engine-drive pump as a working medium, and the input rotation from the engine is speed-changed based on the realized shift stage, and then the speed-changed rotation is outputted, comprising:

a controller comprising:
(a) a starting-period shift-stage thrown state detecting section configured to detect whether the automated manual transmission is in a starting-period shift-stage thrown state where the automated manual transmission is thrown into a shift stage during a starting period of the engine;
(b) an undesirably-kept-engaged automatic clutch failure detecting section configured to detect whether a clutch failure that the automatic clutch remains engaged undesirably, occurs; and
(c) a neutral-range-period abnormality countermeasure section configured to inhibit a supply of the working oil used for automatic-clutch engagement-and-disengagement control and automatic gear shifting, for preventing the vehicle from beginning to move, while a selected operating range is a neutral range at which power transmission through the automated manual transmission is disabled and rotation of a transmission output shaft is not mechanically restricted, under a condition where the automated manual transmission is in the starting-period shift-stage thrown state during the starting period of the engine and the clutch failure that the automatic clutch remains engaged undesirably, occurs.

2. The abnormal-period automatic shift control apparatus as claimed in claim 1, wherein:

the controller further comprises:
(d) a parking-range-period abnormality countermeasure section configured to permit the supply of the working oil used for automatic-clutch engagement-and-disengagement control and automatic gear shifting, for canceling the starting-period shift-stage thrown state, while a selected operating range is a parking range at which power transmission through the automated manual transmission is disabled and rotation of a transmission output shaft is mechanically restricted, under a condition where the starting-period shift-stage thrown state detecting section determines that the automated manual transmission is in the starting-period shift-stage thrown state during the starting period of the engine and the undesirably-kept-engaged automatic clutch failure detecting section determines that the clutch failure that a clutch control pressure is held at a pressure value that the automatic clutch remains engaged, occurs.

3. The abnormal-period automatic shift control apparatus as claimed in claim 1, wherein:
the neutral-range-period abnormality countermeasure section is further configured to start up the engine, while inhibiting the supply of the working oil used for automatic-clutch engagement-and-disengagement control and automatic gear shifting; and
the controller further comprises:
(e) a traveling-range-selection-period abnormality countermeasure section configured to permit the supply of the working oil used for automatic-clutch engagement-and-disengagement control and automatic gear shifting, for canceling the starting-period shift-stage thrown state, when, after the engine has been started up, switching from the neutral range to a traveling range at which power transmission through the automated manual transmission is enabled occurs, and a traveling direction determined based on the traveling range is identical to a traveling direction determined based on a combination of the starting-period shift-stage thrown state and the clutch failure, and configured to inhibit the supply of the working oil used for automatic-clutch engagement-and-disengagement control and automatic gear shifting, for preventing the vehicle from beginning to move, when, after the engine has been started up, switching from the neutral range to a traveling range occurs, and a traveling direction determined based on the traveling range is opposite to a traveling direction determined based on a combination of the starting-period shift-stage thrown state and the clutch failure.

4. The abnormal-period automatic shift control apparatus as claimed in claim 1, wherein:
the neutral-range-period abnormality countermeasure section is further configured to start up the engine, while inhibiting the supply of the working oil used for automatic-clutch engagement-and-disengagement control and automatic gear shifting; and
the controller further comprises:
(f) a parking-range-selection-period abnormality countermeasure section configured to permit the supply of the working oil used for automatic-clutch engagement-and-disengagement control and automatic gear shifting, for canceling the starting-period shift-stage thrown state, when, after the engine has been started up, switching from the neutral range to a parking range at which power transmission through the automated manual transmission is disabled and rotation of a transmission output shaft is mechanically restricted occurs.

5. The abnormal-period automatic shift control apparatus as claimed in claim 1, wherein:
the controller further comprises:
(g) a traveling-range-period abnormality countermeasure section configured to permit the supply of the working oil used for automatic-clutch engagement-and-disengagement control and automatic gear shifting, for canceling the starting-period shift-stage thrown state, while a selected operating range is a traveling range at which power transmission through the automated manual transmission is enabled, and a traveling direction determined based on the traveling range is identical to a traveling direction determined based on a combination of the starting-period shift-stage thrown state and the clutch failure, and configured to inhibit the supply of the working oil used for automatic-clutch engagement-and-disengagement control and automatic gear shifting, for preventing the vehicle from beginning to move, while the selected operating range is a traveling range, and a traveling direction determined based on the traveling range is opposite to a traveling direction determined based on a combination of the starting-period shift-stage thrown state and the clutch failure, under a condition where the starting-period shift-stage thrown state detecting section determines that the automated manual transmission is in the starting-period shift-stage thrown state during the starting period of the engine and the undesirably-kept-engaged automatic clutch failure detecting section determines that the clutch failure that a clutch control pressure is held at a pressure value that the automatic clutch remains engaged, occurs.

6. The abnormal-period automatic shift control apparatus as claimed in claim 1, wherein:
the automated manual transmission has a plurality of shift-stage groups, and the automatic clutch is provided for each of the shift-stage groups;
the controller further comprises:
(g) a traveling-range-period abnormality countermeasure section configured to permit the supply of the working oil used for automatic-clutch engagement-and-disengagement control and automatic gear shifting, for canceling the starting-period shift-stage thrown state, while a selected operating range is a traveling range at which power transmission through the automated manual transmission is enabled, and a traveling direction determined based on the traveling range is identical to a traveling direction determined based on a combination of the starting-period shift-stage thrown state and the clutch failure, and configured to inhibit the supply of the working oil used for automatic-clutch engagement-and-disengagement control and automatic gear shifting, for preventing the vehicle from beginning to move, while the selected operating range is a traveling range, and a traveling direction determined based on the traveling range is opposite to a traveling direction determined based on a combination of the starting-period shift-stage thrown state and the clutch failure, under a condition where the starting-period shift-stage thrown state detecting section determines that the automated manual transmission is in the starting-period shift-stage thrown state during the starting period of the engine and the undesirably-kept-engaged automatic clutch failure detecting section determines that the clutch failure that a clutch control pressure is held at a pressure value that the automatic clutch remains engaged, occurs; and
the traveling-range-period abnormality countermeasure section is further configured to take an abnormality countermeasure that, after the starting-period shift-stage thrown state has been canceled, automatic gear shifting can be made by switching between shift steps in a shift-step group associated with the automatic clutch included in an unfailed clutch control system in which the clutch failure does not occur.

7. The abnormal-period automatic shift control apparatus as claimed in claim 1, wherein:
the automated manual transmission comprises:
(a) a shift-stage-pressure hydraulic module configured to create a shift-stage pressure for automatic gear shifting, using the working oil from the engine-drive oil pump as the working medium, for realizing the desired shift stage; and
(b) a clutch hydraulic module configured to create, based on the shift-stage pressure, a clutch control pressure for automatic-clutch engagement-and-disengagement control, for enabling the changeover in the transmission gear train in conjunction with the automatic gear shifting achieved by the shift-stage pressure; and
the neutral-range-period abnormality countermeasure section is configured to execute abnormality-countermeasure control by inhibiting the supply of the working oil by switching an operating mode of the shift-stage-pressure hydraulic module to an uncreated state of the shift-stage pressure.

8. The abnormal-period automatic shift control apparatus as claimed in claim 2, wherein:
the automated manual transmission comprises:
(a) a shift-stage-pressure hydraulic module configured to create a shift-stage pressure for automatic gear shifting, using the working oil from the engine-drive oil pump as the working medium, for realizing the desired shift stage; and
(b) a clutch hydraulic module configured to create, based on the shift-stage pressure, a clutch control pressure for automatic-clutch engagement-and-disengagement control, for enabling the changeover in the transmission gear train in conjunction with the automatic gear shifting achieved by the shift-stage pressure; and
the parking-range-period abnormality countermeasure section is configured to execute abnormality-countermeasure control by permitting the supply of the working oil by switching an operating mode of the shift-stage-pressure hydraulic module to a created state of the shift-stage pressure.

9. The abnormal-period automatic shift control apparatus as claimed in claim 3, wherein:
the automated manual transmission comprises:
(a) a shift-stage-pressure hydraulic module configured to create a shift-stage pressure for automatic gear shifting, using the working oil from the engine-drive oil pump as the working medium, for realizing the desired shift stage; and
(b) a clutch hydraulic module configured to create, based on the shift-stage pressure, a clutch control pressure for automatic-clutch engagement-and-disengagement control, for enabling the changeover in the transmission gear train in conjunction with the automatic gear shifting achieved by the shift-stage pressure; and
the traveling-range-selection-period abnormality countermeasure section is configured to execute abnormality-countermeasure control by permitting or inhibiting the supply of the working oil by switching an operating mode of the shift-stage-pressure hydraulic module between created and uncreated states of the shift-stage pressure.

10. The abnormal-period automatic shift control apparatus as claimed in claim 4, wherein:
the automated manual transmission comprises:
(a) a shift-stage-pressure hydraulic module configured to create a shift-stage pressure for automatic gear shifting, using the working oil from the engine-drive oil pump as the working medium, for realizing the desired shift stage; and
(b) a clutch hydraulic module configured to create, based on the shift-stage pressure, a clutch control pressure for automatic-clutch engagement-and-disengagement control, for enabling the changeover in the transmission gear train in conjunction with the automatic gear shifting achieved by the shift-stage pressure; and
the parking-range-selection-period abnormality countermeasure section is configured to execute abnormality-countermeasure control by permitting or inhibiting the supply of the working oil by switching an operating mode of the shift-stage-pressure hydraulic module between created and uncreated states of the shift-stage pressure.

11. The abnormal-period automatic shift control apparatus as claimed in claim 5, wherein:
the automated manual transmission comprises:
(a) a shift-stage-pressure hydraulic module configured to create a shift-stage pressure for automatic gear shifting, using the working oil from the engine-drive oil pump as the working medium, for realizing the desired shift stage; and
(b) a clutch hydraulic module configured to create, based on the shift-stage pressure, a clutch control pressure for automatic-clutch engagement-and-disengagement control, for enabling the changeover in the transmission gear train in conjunction with the automatic gear shifting achieved by the shift-stage pressure; and
the traveling-range-selection-period abnormality countermeasure section is configured to execute abnormality-countermeasure control by permitting or inhibiting the supply of the working oil by switching an operating mode of the shift-stage-pressure hydraulic module between created and uncreated states of the shift-stage pressure.

12. The abnormal-period automatic shift control apparatus as claimed in claim 7, wherein:
the shift-stage-pressure hydraulic module comprises a shift-stage pressure solenoid, which is configured to permit or inhibit the supply of the working oil by energizing or de-energizing the shift-stage pressure solenoid.

* * * * *